US012566921B2

(12) United States Patent (10) Patent No.: US 12,566,921 B2

Pham et al. (45) Date of Patent: Mar. 3, 2026

(54) GAZETTEER INTEGRATION FOR NEURAL NAMED ENTITY RECOGNITION

(71) Applicant: Oracle International Corporation, Redwood Shores, CA (US)

(72) Inventors: Tuyen Quang Pham, Melbourne (AU); Cong Duy Vu Hoang, Melbourne (AU); Mark Edward Johnson, Sydney (AU); Thanh Long Duong, Melbourne (AU)

(73) Assignee: Oracle International Corporation, Redwood Shores, CA (US)

( * ) Notice: Subject to any disclaimer, the term of this patent is extended or adjusted under 35 U.S.C. 154(b) by 363 days.

(21) Appl. No.: 18/087,629

(22) Filed: Dec. 22, 2022

(65) Prior Publication Data

US 2023/0205999 A1 Jun. 29, 2023

Related U.S. Application Data

(60) Provisional application No. 63/293,440, filed on Dec. 23, 2021.

(51) Int. Cl.
G06F 40/295 (2020.01)
G06F 40/205 (2020.01)
G06F 40/284 (2020.01)

(52) U.S. Cl.
CPC .......... G06F 40/295 (2020.01); G06F 40/205 (2020.01); G06F 40/284 (2020.01)

(58) Field of Classification Search
CPC .... G06F 40/295; G06F 40/205; G06F 40/284; G06F 40/242; G06N 3/0442; G06N 3/047; G06N 3/082; G06N 3/0455; G06N 3/09
See application file for complete search history.

(56) References Cited

U.S. PATENT DOCUMENTS

| | | | |
|---|---|---|---|
| 11,604,925 B1* | 3/2023 | Lee ...................... | G06N 3/0442 |
| 2019/0213470 A1* | 7/2019 | Schmidt ................ | G06N 3/084 |
| 2019/0377790 A1 | 12/2019 | Redmond et al. | |
| 2022/0012588 A1* | 1/2022 | Rhee ...................... | G06N 3/04 |

(Continued)

OTHER PUBLICATIONS

Fetahu, Besnik, et al. "Gazetteer enhanced named entity recognition for code-mixed web queries." Proceedings of the 44th International ACM SIGIR Conference on Research and Development in Information Retrieval. 2021 (Year: 2021).*

(Continued)

*Primary Examiner* — Athar N Pasha

(74) *Attorney, Agent, or Firm* — Kilpatrick Townsend & Stockton LLP

(57) ABSTRACT

Techniques are provided for named entity recognition using a gazetteer incorporated with a neural network. An utterance is received from a user. The utterance is input into a neural network comprising model parameters learned for named entity recognition. The neural network generates a first representation of one or more named entities based on the utterance. A gazetteer is searched based on the input utterance to generate a second representation of one or more named entities identified in the utterance. The first named entity representation is combined with the second named entity representation to generate a combined named entity representation. The combined named entity representation is output for facilitating a response to the user.

17 Claims, 8 Drawing Sheets

(56)         References Cited

U.S. PATENT DOCUMENTS

| | | |
|---|---|---|
| 2023/0046367 A1 | 2/2023 | Doyen et al. |
| 2023/0154455 A1* | 5/2023 | Vu ..................... G10L 15/1815 |
| | | 704/243 |

OTHER PUBLICATIONS

Lin, Hongyu, et al. "Gazetteer-enhanced attentive neural networks for named entity recognition." Proceedings of the 2019 Conference on Empirical Methods in Natural Language Processing and the 9th International Joint Conference on Natural Language Processing (EMNLP-IJCNLP). 2019 (Year: 2019).*

Gazetteer Enhanced NER (Year: 2021).*

Gazetteer Enhanced ANN (Year: 2019).*

Emelyanov et al., "Multilingual Named Entity Recognition Using Pretrained Embeddings, Attention Mechanism and NCRF", Proceedings of the 7th Workshop on Balto-Slavic Natural Language Processing, Aug. 2, 2019, pp. 94-99.

Liu et al., "Towards Improving Neural Named Entity Recognition with Gazetteers", Proceedings of the 57th Annual Meeting of the Association for Computational Linguistics, Jul. 28-Aug. 2, 2019, pp. 5301-5307.

Magnolini et al., "How to Use Gazetteers for Entity Recognition with Neural Models", Proceedings of the 5th Workshop on Semantic Deep Learning (SemDeep-5), Available Online at: https://aclanthology.org/W19-5807.pdf, Aug. 2019, 10 pages.

Peshterliev et al., "Self-Attention Gazetteer Embeddings for Named-Entity Recognition", Available Online at: https://arxiv.org/pdf/2004.04060.pdf, Apr. 18, 2020, 6 pages.

Ratinov et al., "Design Challenges and Misconceptions in Named Entity Recognition", Proceedings of the Thirteenth Conference on Computational Natural Language Learning (CoNLL), Jun. 2009, pp. 147-155.

Song et al., "Gazetteer Generation for Neural Named Entity Recognition", The Thirty-Third International Flairs Conference (Flairs-33), May 2020, pp. 298-301.

Song et al., "Improving Neural Named Entity Recognition with Gazetteers", Available Online at: https://arxiv.org/pdf/2003.03072.pdf, Mar. 2020, 8 pages.

Srivastava et al., "Dropout: A Simple Way to Prevent Neural Networks from Overfitting", Journal of Machine Learning Research, vol. 15, No. 1, Jan. 2014, pp. 1929-1958.

Vaswani et al., "Attention Is All You Need", 31st Conference on Neural Information Processing Systems (NIPS 2017), Jun. 2017, 11 pages.

Yang et al., "Drop-Out Conditional Random Fields for Twitter with Huge Mined Gazetteer", Proceedings of NAACL-HLT, Jun. 12-17, 2016, pp. 282-288.

Zhang et al., "Token Drop Mechanism for Neural Machine Translation", Proceedings of the 28th International Conference on Computational Linguistics, Dec. 8-13, 2020, pp. 4298-4303.

U.S. Appl. No. 18/087,647, Non-Final Office Action, mailed on May 9, 2025, 34 pages.

Maldonado-Cruz , "Tuning Machine Learning Dropout for Subsurface Uncertainty Model Accuracy", Journal of Petroleum Science and Engineering, vol. 205, Oct. 2021, 9 pages.

Meng et al., "Distantly-Supervised Named Entity Recognition With Noise-Robust Learning and Language Model Augmented Self-Training", Proceedings of the 2021 Conference on Empirical Methods in Natural Language Processing, Nov. 7-11, 2021, pp. 10367-10378.

U.S. Appl. No. 18/087,647, "Notice of Allowance", mailed Nov. 10, 2025, 24 pages.

Xue et al., "Convolutional Recurrent Neural Networks with a Self-Attention Mechanism for Personnel Performance Prediction", Entropy, vol. 21, No., 12, Dec. 16, 2019, 16 pages.

* cited by examiner

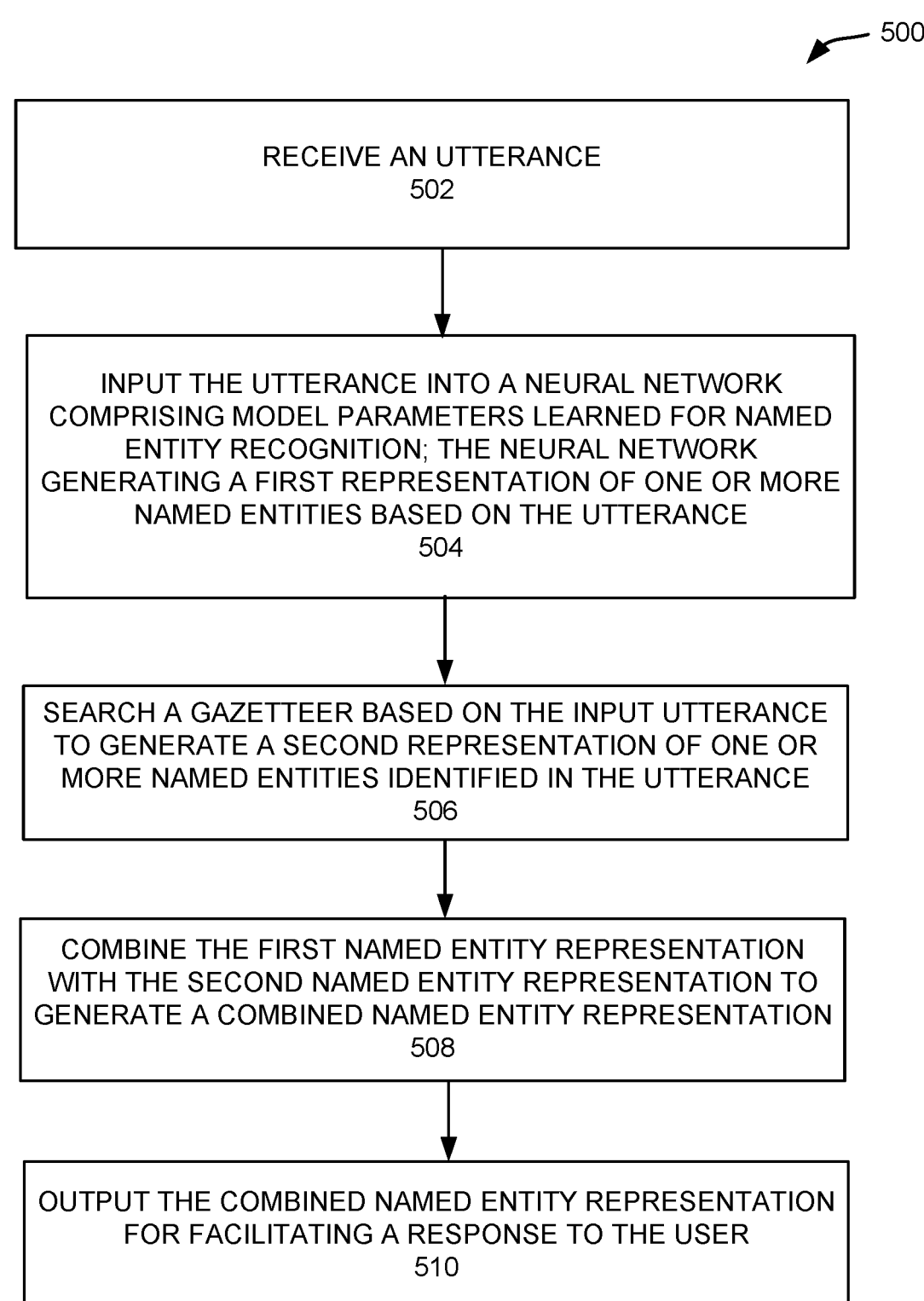

500

RECEIVE AN UTTERANCE
502

INPUT THE UTTERANCE INTO A NEURAL NETWORK
COMPRISING MODEL PARAMETERS LEARNED FOR NAMED
ENTITY RECOGNITION; THE NEURAL NETWORK
GENERATING A FIRST REPRESENTATION OF ONE OR MORE
NAMED ENTITIES BASED ON THE UTTERANCE
504

SEARCH A GAZETTEER BASED ON THE INPUT UTTERANCE
TO GENERATE A SECOND REPRESENTATION OF ONE OR
MORE NAMED ENTITIES IDENTIFIED IN THE UTTERANCE
506

COMBINE THE FIRST NAMED ENTITY REPRESENTATION
WITH THE SECOND NAMED ENTITY REPRESENTATION TO
GENERATE A COMBINED NAMED ENTITY REPRESENTATION
508

OUTPUT THE COMBINED NAMED ENTITY REPRESENTATION
FOR FACILITATING A RESPONSE TO THE USER
510

Figure 6:
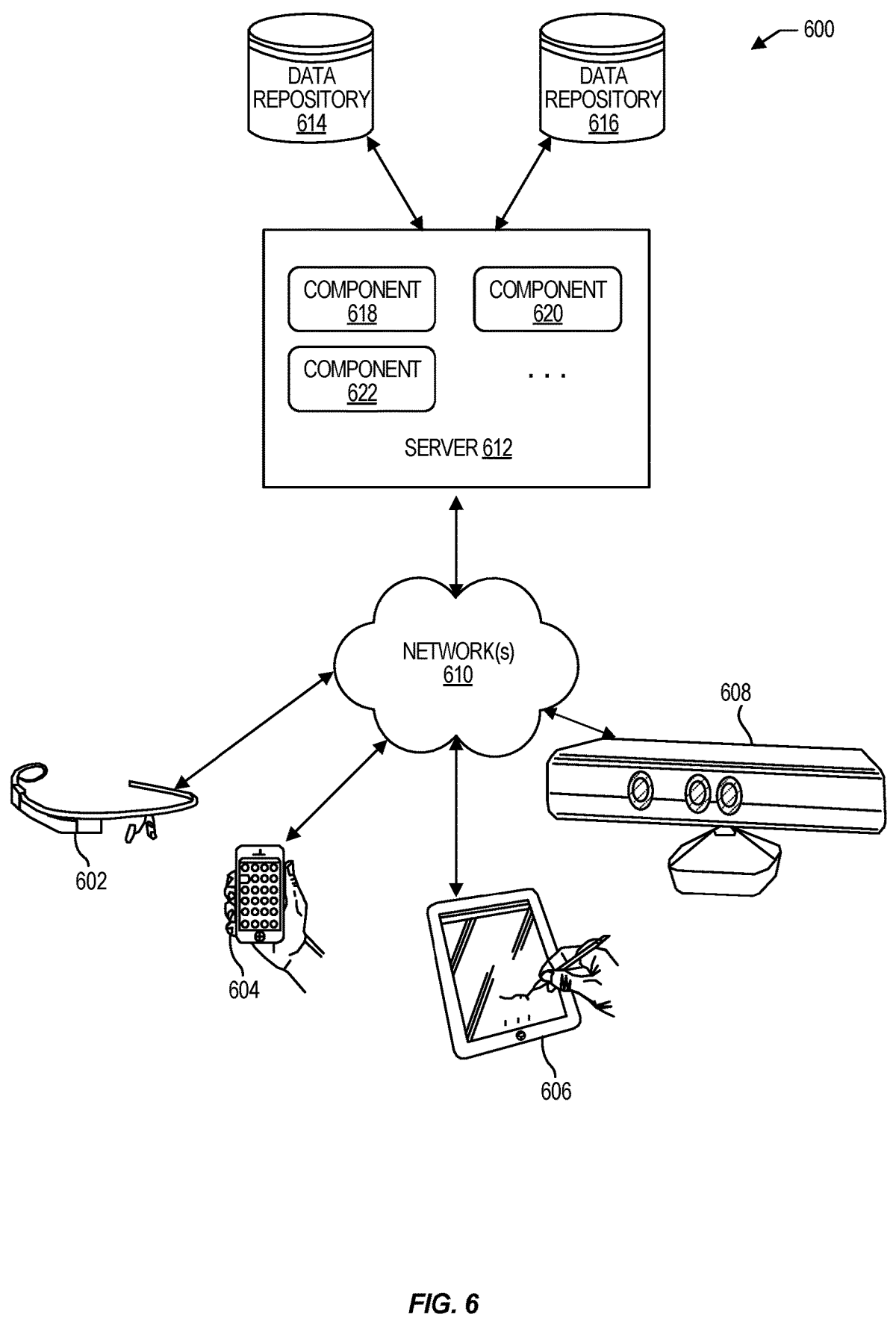

DATA REPOSITORY 614

DATA REPOSITORY 616

COMPONENT 618

COMPONENT 620

COMPONENT 622

. . .

SERVER 612

NETWORK(s) 610

GAZETTEER INTEGRATION FOR NEURAL NAMED ENTITY RECOGNITION

CROSS REFERENCE TO RELATED APPLICATIONS

This application claims the priority and benefit of U.S. Provisional Application No. 63/293,440, filed on Dec. 23, 2021, the disclosure of which is incorporated herein by reference in its entirety for all purposes.

FIELD OF THE INVENTION

The present disclosure relates generally to artificial intelligence techniques, and more particularly, to techniques for named entity recognition using a gazetteer incorporated with a neural network.

BACKGROUND

Artificial intelligence has many applications. To illustrate, many users around the world are on instant messaging or chat platforms in order to get instant reaction. Organizations often use these instant messaging or chat platforms to engage with customers (or end users) in live conversations. However, it can be very costly for organizations to employ service people to engage in live communication with customers or end users. Chatbots or bots have begun to be developed to simulate conversations with end users, especially over the Internet. End users can communicate with bots through messaging apps that the end users have already installed and used. An intelligent bot, generally powered by artificial intelligence (AI), can communicate more intelligently and contextually in live conversations, and thus may allow for a more natural conversation between the bot and the end users for improved conversational experience. Instead of the end user learning a fixed set of keywords or commands that the bot knows how to respond to, an intelligent bot may be able to understand the end user's intention based upon user utterances in natural language and respond accordingly.

However, artificial intelligence-based solutions, such as chatbots, can be difficult to build because these automated solutions require specific knowledge in certain fields and the application of certain techniques that may be solely within the capabilities of specialized developers. As part of building such chatbots, a developer may first understand the needs of enterprises and end users. The developer may then analyze and make decisions related to, for example, selecting data sets to be used for the analysis, preparing the input data sets for analysis (e.g., cleansing the data, extracting, formatting, and/or transforming the data prior to analysis, performing data features engineering, etc.), identifying an appropriate machine learning (ML) technique(s) or model(s) for performing the analysis, and improving the technique or model to improve results/outcomes based upon feedback. The task of identifying an appropriate model may include developing multiple models, possibly in parallel, iteratively testing and experimenting with these models, before identifying a particular model (or models) for use. Further, supervised learning-based solutions typically involve a training phase, followed by an application (i.e., inference) phase, and iterative loops between the training phase and the application phase. The developer may be responsible for carefully implementing and monitoring these phases to achieve optimal solutions. For example, to train the ML technique(s) or model(s), precise training data is required to enable the algorithms to understand and learn certain patterns or features (e.g., for chatbots—intent extraction and careful syntactic analysis, not just raw language processing) that the ML technique(s) or model(s) will use to predict the outcome desired (e.g., inference of an intent from an utterance). In order to ensure the ML technique(s) or model(s) learn these patterns and features properly, the developer may be responsible for selecting, enriching, and optimizing sets of training data for the ML technique(s) or model(s).

BRIEF SUMMARY

Techniques disclosed herein relate generally to artificial intelligence techniques. More specifically and without limitation, techniques disclosed herein relate to techniques for gazetteer integration for neural named entity recognition.

In various embodiments, a computer-implemented method is provided that includes: receiving an utterance from a user; inputting the utterance into a neural network comprising model parameters learned for named entity recognition; generating, by the neural network, a first representation of one or more named entities based on the utterance; searching a gazetteer based on the utterance to generate a second representation of one or more named entities identified in the utterance; combining the first named entity representation with the second named entity representation to generate a combined named entity representation; and outputting the combined named entity representation for facilitating a response to the user.

In some embodiments, the method further comprises multi-hot encoding an initial result of searching the gazetteer to generate the second representation.

In some embodiments, combining the first representation with the second representation comprises: computing a weighted linear interpolation of the first representation and the second representation.

In some embodiments, wherein combining the first representation with the second representation comprises: concatenating the first representation and the second representation.

In some embodiments, wherein combining the first representation with the second representation comprises: computing a sequence of attention vectors based on the first representation and the second representation.

In some embodiments, wherein the method is performed by a machine learning model comprising the neural network, the method further comprising training the machine learning model by: accessing a training utterance; inputting the training utterance into the neural network; generating, by the neural network, a first training representation based on the utterance; searching the gazetteer based on the training utterance to generate a second training representation; and training the machine learning model based on the first training representation and the second training representation.

In some embodiments, wherein training the machine learning model further comprises identifying a dropout parameter; and applying the dropout parameter to the first training representation.

In various embodiments, a system is provided that includes one or more data processors and a non-transitory computer readable storage medium containing instructions which, when executed on the one or more data processors, cause the one or more data processors to perform part or all of one or more methods disclosed herein.

In various embodiments, a computer-program product is provided that is tangibly embodied in a non-transitory machine-readable storage medium and that includes instructions configured to cause one or more data processors to perform part or all of one or more methods disclosed herein.

The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

FIG. 5 is a flowchart illustrating a process for named entity recognition using a gazetteer integrated with a neural network in accordance with various embodiments.

FIG. 6 depicts a simplified diagram of a distributed system for implementing various embodiments.

DETAILED DESCRIPTION

Figure 1:
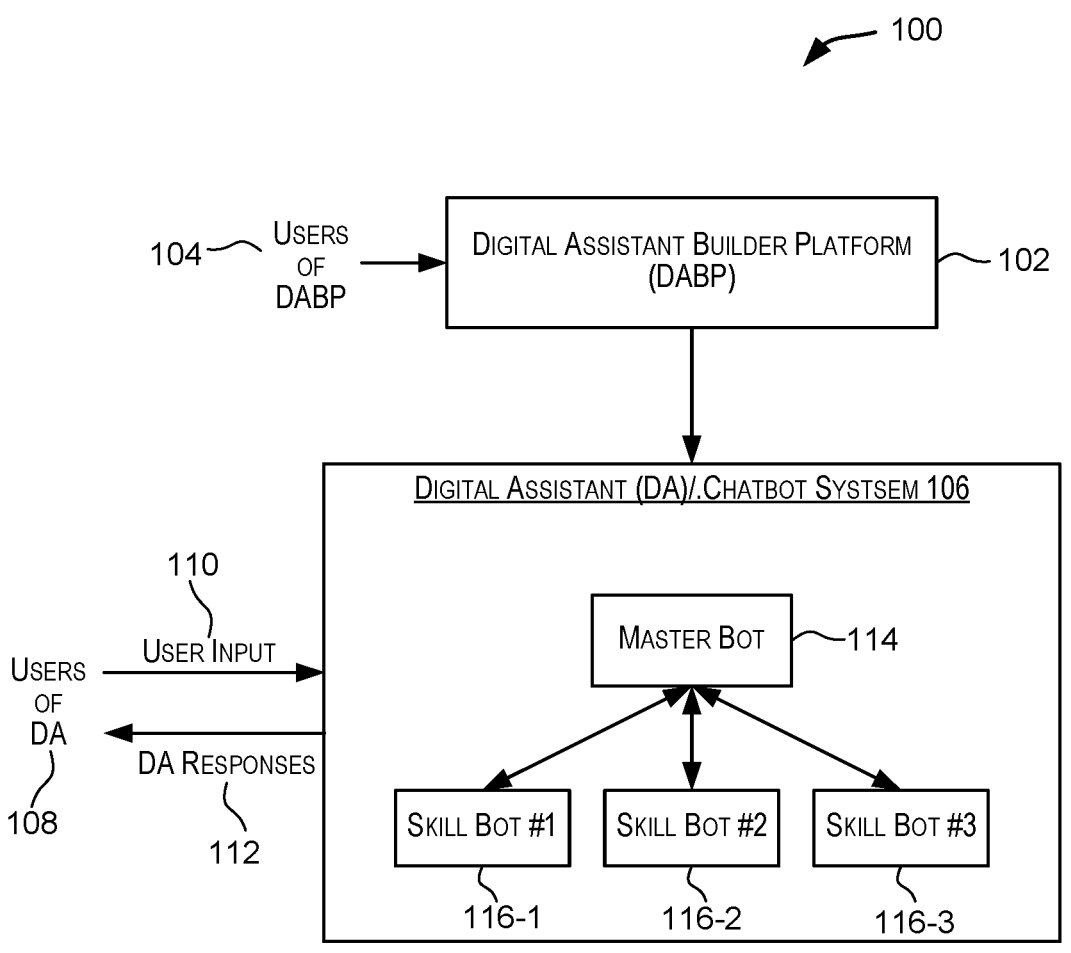
FIG. 1 is a simplified block diagram of a distributed environment incorporating an exemplary embodiment.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Introduction

Artificial intelligence has many applications. For example, a digital assistant is an artificial intelligent driven interface that helps users accomplish a variety of tasks in natural language conversations. For each digital assistant, a customer may assemble one or more skills. Skills (also described herein as chatbots, bots, or skill bots) are individual bots that are focused on specific types of tasks, such as tracking inventory, submitting time cards, and creating expense reports. When an end user engages with the digital assistant, the digital assistant evaluates the end user input and routes the conversation to and from the appropriate chatbot. The digital assistant can be made available to end users through a variety of channels such as FACEBOOK® Messenger, SKYPE MOBILE® messenger, or a Short Message Service (SMS). Channels carry the chat back and forth from end users on various messaging platforms to the digital assistant and its various chatbots. The channels may also support user agent escalation, event-initiated conversations, and testing.

A chatbot processes an input utterance to discern meaning. As used herein, an utterance or a message may refer to a set of words (e.g., one or more sentences) exchanged during a conversation with a chatbot.

As part of the processing performed by artificial intelligence-based technology such as a chatbot system, named entity recognition may be performed by a Named Entity Recognizer (NER) component. NERs are models trained to recognize the names of things, which can be proper names (e.g., Florida), goods (e.g., shoes), services (e.g., massage), and so forth. The NERs may also be trained to recognize descriptive words or phrases such as colors and sizes. Accordingly, "named entity" as used herein can include words or phrases that a machine learning model has been trained to identify, including things, as well as words or phrases associated with such things. Upon recognizing a named entity, the NER may label the corresponding word or phrase with a named entity type. A named entity type is a category of named entity. For example, the phrase New York is labeled with the named entity type city, and the word seventy is labeled with the named entity type temperature. The NER may include one or more machine-learning models (e.g., neural networks) trained to identify a named entity corresponding to identified words or phrases.

Building an artificial intelligence-based system such as a chatbot system that can accurately identify a named entity based upon user utterances is a challenging task in part due to the subtleties and ambiguity of natural languages and the dimension of the input space (e.g., possible user utterances) and the size of the output space (number of named entities). As an example, in the training process, the NER model may place excessive focus on the entity value itself rather than the surrounding contextual information. As a specific example, in the utterance "I want to go to Central Park," "Central Park" is a named entity and the rest of the utterance, "I want to go to," provides contextual information useable for named entity recognition and other dialog processing tasks. It has been observed that, when performing named entity recognition using traditional techniques, some entities are misclassified or missed. This can result from the model being overreliant or underreliant on contextual data. Another issue may be that certain named entities are not recognized, due to issues with the training data or training process.

In some embodiments, named entity recognition results are improved by using a joint, gazetteer and neural network approach. Neural networks such as BERT (Bidirectional Encoder Representations from Transformers) have proven very successful for named entity recognition, but can nevertheless suffer from the above-noted shortcomings. Improved results are provided by incorporating a gazetteer into a neural network-based NER system.

A gazetteer may include a set of lists containing names of entities such as countries, restaurants, months, and so forth. Open source gazetteers are available, such as Wikidata. Gazetteers can also be developed in a customized fashion. For example, a particular customer (e.g., associated with a client device using dialog processing as a service) can specify a set of entities that may come up in their dialog tasks (e.g., for a furniture store, a particularly detailed list of suppliers and furniture types may be appropriate). The gazetteer can be a very useful resource for improving NER systems. For example, by using gazetteers, dynamic entities can be used, the amount of training data needed can be reduced, changing behavior can be facilitated without retraining the model. Additionally, gazetteers can be used for a custom NER. Gazetteers can in some implementations be leveraged for external and prior knowledge. Gazetteers can also be customized, which can facilitate developing a custom NER system.

Techniques are provided for named entity recognition using a gazetteer integrated with a neural network. For example, a gazetteer layer can be integrated with a deep learning NER. This combined model can be trained on features from both gazetteer search results and contextual embeddings produced by the deep learning NER neural network. At runtime, an utterance is received and is provided to the neural network to generate a first representation of one or more named entities identified in the utterance. A gazetteer is searched based on the input utterance to generate a second representation of one or more named entities identified in the utterance. The first named entity representation is combined with the second named entity representation to generate a combined named entity representation. The combined named entity representation is output for further processing. The further processing may, for example, include determining a user intent corresponding to the utterance and/or providing a response to the user.

Bot and Analytic Systems

A bot (also referred to as a skill, chatbot, chatterbot, or talkbot) is a computer program that can perform conversations with end users. The bot can generally respond to natural-language messages (e.g., questions or comments) through a messaging application that uses natural-language messages. Enterprises may use one or more bot systems to communicate with end users through a messaging application. The messaging application, which may be referred to as a channel, may be an end user preferred messaging application that the end user has already installed and familiar with. Thus, the end user does not need to download and install new applications in order to chat with the bot system. The messaging application may include, for example, over-the-top (OTT) messaging channels (such as Facebook Messenger, Facebook WhatsApp, WeChat, Line, Kik, Telegram, Talk, Skype, Slack, or SMS), virtual private assistants (such as Amazon Dot, Echo, or Show, Google Home, Apple HomePod, etc.), mobile and web app extensions that extend native or hybrid/responsive mobile apps or web applications with chat capabilities, or voice based input (such as devices or apps with interfaces that use Siri, Cortana, Google Voice, or other speech input for interaction).

In some examples, a bot system may be associated with a Uniform Resource Identifier (URI). The URI may identify the bot system using a string of characters. The URI may be used as a webhook for one or more messaging application systems. The URI may include, for example, a Uniform Resource Locator (URL) or a Uniform Resource Name (URN). The bot system may be designed to receive a message (e.g., a hypertext transfer protocol (HTTP) post call message) from a messaging application system. The HTTP post call message may be directed to the URI from the messaging application system. In some embodiments, the message may be different from a HTTP post call message. For example, the bot system may receive a message from a Short Message Service (SMS). While discussion herein may refer to communications that the bot system receives as a message, it should be understood that the message may be an HTTP post call message, a SMS message, or any other type of communication between two systems.

End users may interact with the bot system through a conversational interaction (sometimes referred to as a conversational user interface (UI)), just as interactions between people. In some cases, the interaction may include the end user saying "Hello" to the bot and the bot responding with a "Hi" and asking the end user how it can help. In some cases, the interaction may also be a transactional interaction with, for example, a banking bot, such as transferring money from one account to another; an informational interaction with, for example, a HR bot, such as checking for vacation balance; or an interaction with, for example, a retail bot, such as discussing returning purchased goods or seeking technical support.

In some embodiments, the bot system may intelligently handle end user interactions without interaction with an administrator or developer of the bot system. For example, an end user may send one or more messages to the bot system in order to achieve a desired goal. A message may include certain content, such as text, emojis, audio, image, video, or other method of conveying a message. In some embodiments, the bot system may convert the content into a standardized form (e.g., a representational state transfer (REST) call against enterprise services with the proper parameters) and generate a natural language response. The bot system may also prompt the end user for additional input parameters or request other additional information. In some embodiments, the bot system may also initiate communication with the end user, rather than passively responding to end user utterances. Described herein are various techniques for identifying an explicit invocation of a bot system and determining an input for the bot system being invoked. In certain embodiments, explicit invocation analysis is performed by a master bot based on detecting an invocation name in an utterance. In response to detection of the invocation name, the utterance may be refined for input to a skill bot associated with the invocation name.

A conversation with a bot may follow a specific conversation flow including multiple states. The flow may define what would happen next based on an input. In some embodiments, a state machine that includes user defined states (e.g., end user intents) and actions to take in the states or from state to state may be used to implement the bot system. A conversation may take different paths based on the end user input, which may impact the decision the bot makes for the flow. For example, at each state, based on the end user input or utterances, the bot may determine the end user's intent in order to determine the appropriate next action to take. As used herein and in the context of an utterance, the term "intent" refers to an intent of the user who provided the utterance. For example, the user may intend to engage a bot in conversation for ordering pizza, so that the user's intent could be represented through the utterance "Order pizza." A user intent can be directed to a particular task that the user wishes a chatbot to perform on behalf of the user. Therefore, utterances can be phrased as questions, commands, requests, and the like, that reflect the user's intent. An intent may include a goal that the end user would like to accomplish.

In the context of the configuration of a chatbot, the term "intent" is used herein to refer to configuration information for mapping a user's utterance to a specific task/action or category of task/action that the chatbot can perform. In order to distinguish between the intent of an utterance (i.e., a user intent) and the intent of a chatbot, the latter is sometimes referred to herein as a "bot intent." A bot intent may comprise a set of one or more utterances associated with the intent. For instance, an intent for ordering pizza can have various permutations of utterances that express a desire to place an order for pizza. These associated utterances can be used to train an intent classifier of the chatbot to enable the intent classifier to subsequently determine whether an input utterance from a user matches the order pizza intent. A bot intent may be associated with one or more dialog flows for starting a conversation with the user and in a certain state. For example, the first message for the order pizza intent could be the question "What kind of pizza would you like?" In addition to associated utterances, a bot intent may further comprise named entities that relate to the intent. For example, the order pizza intent could include variables or parameters used to perform the task of ordering pizza, e.g., topping 1, topping 2, pizza type, pizza size, pizza quantity, and the like. The value of an entity is typically obtained through conversing with the user.

FIG. 1 is a simplified block diagram of an environment 100 incorporating a chatbot system according to certain embodiments. Environment 100 comprises a digital assistant builder platform (DABP) 102 that enables users of DABP 102 to create and deploy digital assistants or chatbot systems. DABP 102 can be used to create one or more digital assistants (or DAs) or chatbot systems. For example, as shown in FIG. 1, user 104 representing a particular enterprise can use DABP 102 to create and deploy a digital assistant 106 for users of the particular enterprise. For example, DABP 102 can be used by a bank to create one or more digital assistants for use by the bank's customers. The same DABP 102 platform can be used by multiple enterprises to create digital assistants. As another example, an owner of a restaurant (e.g., a pizza shop) may use DABP 102 to create and deploy a digital assistant that enables customers of the restaurant to order food (e.g., order pizza).

For purposes of this disclosure, a "digital assistant" is an entity that helps users of the digital assistant accomplish various tasks through natural language conversations. A digital assistant can be implemented using software only (e.g., the digital assistant is a digital entity implemented using programs, code, or instructions executable by one or more processors), using hardware, or using a combination of hardware and software. A digital assistant can be embodied or implemented in various physical systems or devices, such as in a computer, a mobile phone, a watch, an appliance, a vehicle, and the like. A digital assistant is also sometimes referred to as a chatbot system. Accordingly, for purposes of this disclosure, the terms digital assistant and chatbot system are interchangeable.

A digital assistant, such as digital assistant 106 built using DABP 102, can be used to perform various tasks via natural language-based conversations between the digital assistant and its users 108. As part of a conversation, a user may provide one or more user inputs 110 to digital assistant 106 and get responses 112 back from digital assistant 106. A conversation can include one or more of inputs 110 and responses 112. Via these conversations, a user can request one or more tasks to be performed by the digital assistant and, in response, the digital assistant is configured to perform the user-requested tasks and respond with appropriate responses to the user.

User inputs 110 are generally in a natural language form and are referred to as utterances. A user utterance 110 can be in text form, such as when a user types in a sentence, a question, a text fragment, or even a single word and provides it as input to digital assistant 106. In some embodiments, a user utterance 110 can be in audio input or speech form, such as when a user says or speaks something that is provided as input to digital assistant 106. The utterances are typically in a language spoken by the user 108. For example, the utterances may be in English, or some other language. When an utterance is in speech form, the speech input is converted to text form utterances in that particular language and the text utterances are then processed by digital assistant 106. Various speech-to-text processing techniques may be used to convert a speech or audio input to a text utterance, which is then processed by digital assistant 106. In some embodiments, the speech-to-text conversion may be done by digital assistant 106 itself.

An utterance, which may be a text utterance or a speech utterance, can be a fragment, a sentence, multiple sentences, one or more words, one or more questions, combinations of the aforementioned types, and the like. Digital assistant 106 is configured to apply natural language understanding (NLU) techniques to the utterance to understand the meaning of the user input. As part of the NLU processing for an utterance, digital assistant 106 is configured to perform processing to understand the meaning of the utterance, which involves identifying one or more intents and one or more entities corresponding to the utterance. Upon understanding the meaning of an utterance, digital assistant 106 may perform one or more actions or operations responsive to the understood meaning or intents. For purposes of this disclosure, it is assumed that the utterances are text utterances that have been provided directly by a user 108 of digital assistant 106 or are the results of conversion of input speech utterances to text form. This however is not intended to be limiting or restrictive in any manner.

For example, a user 108 input may request a pizza to be ordered by providing an utterance such as "I want to order a pizza." Upon receiving such an utterance, digital assistant 106 is configured to understand the meaning of the utterance and take appropriate actions. The appropriate actions may involve, for example, responding to the user with questions requesting user input on the type of pizza the user desires to order, the size of the pizza, any toppings for the pizza, and the like. The responses provided by digital assistant 106 may also be in natural language form and typically in the same language as the input utterance. As part of generating these responses, digital assistant 106 may perform natural language generation (NLG). For the user ordering a pizza, via the conversation between the user and digital assistant 106, the digital assistant may guide the user to provide all the requisite information for the pizza order, and then at the end of the conversation cause the pizza to be ordered. Digital assistant 106 may end the conversation by outputting information to the user indicating that the pizza has been ordered.

At a conceptual level, digital assistant 106 performs various processing in response to an utterance received from a user. In some embodiments, this processing involves a series or pipeline of processing steps including, for example, understanding the meaning of the input utterance (sometimes referred to as Natural Language Understanding (NLU), determining an action to be performed in response to the utterance, where appropriate causing the action to be performed, generating a response to be output to the user responsive to the user utterance, outputting the response to the user, and the like. The NLU processing can include parsing the received input utterance to understand the structure and meaning of the utterance, refining and reforming the utterance to develop a better understandable form (e.g., logical form) or structure for the utterance. Generating a response may include using NLG techniques.

The NLU processing performed by a digital assistant, such as digital assistant 106, can include various NLP related processing such as sentence parsing (e.g., tokenizing, lemmatizing, identifying part-of-speech tags for the sentence, identifying named entities in the sentence, generating dependency trees to represent the sentence structure, splitting a sentence into clauses, analyzing individual clauses, resolving anaphoras, performing chunking, and the like). In certain embodiments, the NLU processing or portions thereof is performed by digital assistant 106 itself. In some other embodiments, digital assistant 106 may use other resources to perform portions of the NLU processing. For example, the syntax and structure of an input utterance sentence may be identified by processing the sentence using a parser, a part-of-speech tagger, and/or a named entity recognizer. In one implementation, for the English language, a parser, a part-of-speech tagger, and a named entity recognizer such as ones provided by the Stanford Natural Language Processing (NLP) Group are used for analyzing the sentence structure and syntax. These are provided as part of the Stanford CoreNLP toolkit.

While the various examples provided in this disclosure show utterances in the English language, this is meant only as an example. In certain embodiments, digital assistant 106 is also capable of handling utterances in languages other than English. Digital assistant 106 may provide subsystems (e.g., components implementing NLU functionality) that are configured for performing processing for different languages. These subsystems may be implemented as pluggable units that can be called using service calls from an NLU core server. This makes the NLU processing flexible and extensible for each language, including allowing different orders of processing. A language pack may be provided for individual languages, where a language pack can register a list of subsystems that can be served from the NLU core server.

A digital assistant, such as digital assistant 106 depicted in FIG. 1, can be made available or accessible to its users 108 through a variety of different channels, such as but not limited to, via certain applications, via social media platforms, via various messaging services and applications, and other applications or channels. A single digital assistant can have several channels configured for it so that it can be run on and be accessed by different services simultaneously.

A digital assistant or chatbot system generally contains or is associated with one or more skills. In certain embodiments, these skills are individual chatbots (referred to as skill bots) that are configured to interact with users and fulfill specific types of tasks, such as tracking inventory, submitting timecards, creating expense reports, ordering food, checking a bank account, making reservations, buying a widget, and the like. For example, for the embodiment depicted in FIG. 1, digital assistant or chatbot system 106 includes skills 116-1, 116-2, and so on. For purposes of this disclosure, the terms "skill" and "skills" are used synonymously with the terms "skill bot" and "skill bots," respectively.

Each skill associated with a digital assistant helps a user of the digital assistant complete a task through a conversation with the user, where the conversation can include a combination of text or audio inputs provided by the user and responses provided by the skill bots. These responses may be in the form of text or audio messages to the user and/or using simple user interface elements (e.g., select lists) that are presented to the user for the user to make selections.

There are various ways in which a skill or skill bot can be associated or added to a digital assistant. In some instances, a skill bot can be developed by an enterprise and then added to a digital assistant using DABP 102. In other instances, a skill bot can be developed and created using DABP 102 and then added to a digital assistant created using DABP 102. In yet other instances, DABP 102 provides an online digital store (referred to as a "skills store") that offers multiple skills directed to a wide range of tasks. The skills offered through the skills store may also expose various cloud services. In order to add a skill to a digital assistant being generated using DABP 102, a user of DABP 102 can access the skills store via DABP 102, select a desired skill, and indicate that the selected skill is to be added to the digital assistant created using DABP 102. A skill from the skills store can be added to a digital assistant as is or in a modified form (for example, a user of DABP 102 may select and clone a particular skill bot provided by the skills store, make customizations or modifications to the selected skill bot, and then add the modified skill bot to a digital assistant created using DABP 102).

Various different architectures may be used to implement a digital assistant or chatbot system. For example, in certain embodiments, the digital assistants created and deployed using DABP 102 may be implemented using a master bot/child (or sub) bot paradigm or architecture. According to this paradigm, a digital assistant is implemented as a master bot that interacts with one or more child bots that are skill bots. For example, in the embodiment depicted in FIG. 1, digital assistant 106 comprises a master bot 114 and skill bots 116-1, 116-2, etc. that are child bots of master bot 114. In certain embodiments, digital assistant 106 is itself considered to act as the master bot.

A digital assistant implemented according to the master-child bot architecture enables users of the digital assistant to interact with multiple skills through a unified user interface, namely via the master bot. When a user engages with a digital assistant, the user input is received by the master bot. The master bot then performs processing to determine the meaning of the user input utterance. The master bot then determines whether the task requested by the user in the utterance can be handled by the master bot itself, else the master bot selects an appropriate skill bot for handling the user request and routes the conversation to the selected skill bot. This enables a user to converse with the digital assistant through a common single interface and still provide the capability to use several skill bots configured to perform specific tasks. For example, for a digital assistance developed for an enterprise, the master bot of the digital assistant may interface with skill bots with specific functionalities, such as a CRM bot for performing functions related to customer relationship management (CRM), an ERP bot for performing functions related to enterprise resource planning (ERP), an HCM bot for performing functions related to human capital management (HCM), etc. This way the end user or consumer of the digital assistant need only know how to access the digital assistant through the common master bot interface and behind the scenes multiple skill bots are provided for handling the user request.

In certain embodiments, in a master bot/child bots infrastructure, the master bot is configured to be aware of the available list of skill bots. The master bot may have access to metadata that identifies the various available skill bots, and for each skill bot, the capabilities of the skill bot including the tasks that can be performed by the skill bot. Upon receiving a user request in the form of an utterance, the master bot is configured to, from the multiple available skill bots, identify or predict a specific skill bot that can best serve or handle the user request. The master bot then routes the utterance (or a portion of the utterance) to that specific skill bot for further handling. Control thus flows from the master bot to the skill bots. The master bot can support multiple input and output channels. In certain embodiments, routing may be performed with the aid of processing performed by one or more available skill bots. For example, as discussed below, a skill bot can be trained to infer an intent for an utterance and to determine whether the inferred intent matches an intent with which the skill bot is configured. Thus, the routing performed by the master bot can involve the skill bot communicating to the master bot an indication of whether the skill bot has been configured with an intent suitable for handling the utterance.

While the embodiment in FIG. 1 shows digital assistant 106 comprising a master bot 114 and skill bots 116-1, 116-2, and 116-3, this is not intended to be limiting. A digital assistant can include various other components (e.g., other systems and subsystems) that provide the functionalities of the digital assistant. These systems and subsystems may be implemented only in software (e.g., code, instructions stored on a computer-readable medium and executable by one or more processors), in hardware only, or in implementations that use a combination of software and hardware.

DABP 102 provides an infrastructure and various services and features that enable a user of DABP 102 to create a digital assistant including one or more skill bots associated with the digital assistant. In some instances, a skill bot can be created by cloning an existing skill bot, for example, cloning a skill bot provided by the skills store. As previously indicated, DABP 102 provides a skills store or skills catalog that offers multiple skill bots for performing various tasks. A user of DABP 102 can clone a skill bot from the skills store. As needed, modifications or customizations may be made to the cloned skill bot. In some other instances, a user of DABP 102 created a skill bot from scratch using tools and services offered by DABP 102. As previously indicated, the skills store or skills catalog provided by DABP 102 may offer multiple skill bots for performing various tasks.

In certain embodiments, at a high level, creating or customizing a skill bot involves the following steps:

(1) Configuring settings for a new skill bot (2) Configuring one or more intents for the skill bot (3) Configuring one or more entities for one or more intents (4) Training the skill bot (5) Creating a dialog flow for the skill bot (6) Adding custom components to the skill bot as needed (7) Testing and deploying the skill bot Each of the above steps is briefly described below.

(1) Configuring settings for a new skill bot—Various settings may be configured for the skill bot. For example, a skill bot designer can specify one or more invocation names for the skill bot being created. These invocation names can then be used by users of a digital assistant to explicitly invoke the skill bot. For example, a user can input an invocation name in the user's utterance to explicitly invoke the corresponding skill bot.

(2) Configuring one or more intents and associated example utterances for the skill bot—The skill bot designer specifies one or more intents (also referred to as bot intents) for a skill bot being created. The skill bot is then trained based upon these specified intents. These intents represent categories or classes that the skill bot is trained to infer for input utterances. Upon receiving an utterance, a trained skill bot infers an intent for the utterance, where the inferred intent is selected from the predefined set of intents used to train the skill bot. The skill bot then takes an appropriate action responsive to an utterance based upon the intent inferred for that utterance. In some instances, the intents for a skill bot represent tasks that the skill bot can perform for users of the digital assistant. Each intent is given an intent identifier or intent name. For example, for a skill bot trained for a bank, the intents specified for the skill bot may include "CheckBalance," "TransferMoney," "DepositCheck," and the like.

For each intent defined for a skill bot, the skill bot designer may also provide one or more example utterances that are representative of and illustrate the intent. These example utterances are meant to represent utterances that a user may input to the skill bot for that intent. For example, for the CheckBalance intent, example utterances may include "What's my savings account balance?", "How much is in my checking account?", "How much money do I have in my account," and the like. Accordingly, various permutations of typical user utterances may be specified as example utterances for an intent.

The intents and their associated example utterances are used as training data to train the skill bot. Various different training techniques may be used. As a result of this training, a predictive model is generated that is configured to take an utterance as input and output an intent inferred for the utterance by the predictive model. In some instances, input utterances are provided to an intent analysis engine, which is configured to use the trained model to predict or infer an intent for the input utterance. The skill bot may then take one or more actions based upon the inferred intent.

(3) Configuring entities for one or more intents of the skill bot—In some instances, additional context may be needed to enable the skill bot to properly respond to a user utterance. For example, there may be situations where a user input utterance resolves to the same intent in a skill bot. For instance, in the above example, utterances "What's my savings account balance?" and "How much is in my checking account?" both resolve to the same CheckBalance intent, but these utterances are different requests asking for different things. To clarify such requests, one or more entities are added to an intent. Using the banking skill bot example, an entity called AccountType, which defines values called "checking" and "saving" may enable the skill bot to parse the user request and respond appropriately. In the above example, while the utterances resolve to the same intent, the value associated with the AccountType entity is different for the two utterances. This enables the skill bot to perform possibly different actions for the two utterances in spite of them resolving to the same intent. One or more entities can be specified for certain intents configured for the skill bot. Entities are thus used to add context to the intent itself. Entities help describe an intent more fully and enable the skill bot to complete a user request.

In certain embodiments, there are two types of entities: (a) built-in entities provided by DABP 102, and (2) custom entities that can be specified by a skill bot designer. Built-in entities are generic entities that can be used with a wide variety of bots. Examples of built-in entities include, without limitation, entities related to time, date, addresses, numbers, email addresses, duration, recurring time periods, currencies, phone numbers, URLs, and the like. Custom entities are used for more customized applications. For example, for a banking skill, an AccountType entity may be defined by the skill bot designer that enables various banking transactions by checking the user input for keywords like checking, savings, and credit cards, etc.

(4) Training the skill bot—A skill bot is configured to receive user input in the form of utterances parse or otherwise process the received input, and identify or select an intent that is relevant to the received user input. As indicated above, the skill bot has to be trained for this. In certain embodiments, a skill bot is trained based upon the intents configured for the skill bot and the example utterances associated with the intents (collectively, the training data), so that the skill bot can resolve user input utterances to one of its configured intents. In certain embodiments, the skill bot uses a predictive model that is trained using the training data and allows the skill bot to discern what users say (or in some cases, are trying to say). DABP 102 provides various different training techniques that can be used by a skill bot designer to train a skill bot, including various machine-learning based training techniques, rules-based training techniques, and/or combinations thereof. In certain embodiments, a portion (e.g., 80%) of the training data is used to train a skill bot model and another portion (e.g., the remaining 20%) is used to test or verify the model. Once trained, the trained model (also sometimes referred to as the trained skill bot) can then be used to handle and respond to user utterances. In certain cases, a user's utterance may be a question that requires only a single answer and no further conversation. In order to handle such situations, a Q&A (question-and-answer) intent may be defined for a skill bot. This enables a skill bot to output replies to user requests without having to update the dialog definition. Q&A intents are created in a similar manner as regular intents. The dialog flow for Q&A intents can be different from that for regular intents.

(5) Creating a dialog flow for the skill bot—A dialog flow specified for a skill bot describes how the skill bot reacts as different intents for the skill bot are resolved responsive to received user input. The dialog flow defines operations or actions that a skill bot will take, e.g., how the skill bot responds to user utterances, how the skill bot prompts users for input, how the skill bot returns data. A dialog flow is like a flowchart that is followed by the skill bot. The skill bot designer specifies a dialog flow using a language, such as markdown language. In certain embodiments, a version of YAML called OBotML may be used to specify a dialog flow for a skill bot. The dialog flow definition for a skill bot acts as a model for the conversation itself, one that lets the skill bot designer choreograph the interactions between a skill bot and the users that the skill bot services.

In certain embodiments, the dialog flow definition for a skill bot contains three sections:

(a) a context section
(b) a default transitions section
(c) a states section

Context section—The skill bot designer can define variables that are used in a conversation flow in the context section. Other variables that may be named in the context section include, without limitation: variables for error handling, variables for built-in or custom entities, user variables that enable the skill bot to recognize and persist user preferences, and the like.

Default transitions section—Transitions for a skill bot can be defined in the dialog flow states section or in the default transitions section. The transitions defined in the default transition section act as a fallback and get triggered when there are no applicable transitions defined within a state, or the conditions required to trigger a state transition cannot be met. The default transitions section can be used to define routing that allows the skill bot to gracefully handle unexpected user actions.

States section—A dialog flow and its related operations are defined as a sequence of transitory states, which manage the logic within the dialog flow. Each state node within a dialog flow definition names a component that provides the functionality needed at that point in the dialog. States are thus built around the components. A state contains component-specific properties and defines the transitions to other states that get triggered after the component executes.

Special case scenarios may be handled using the states sections. For example, there might be times when you want to provide users the option to temporarily leave a first skill they are engaged with to do something in a second skill within the digital assistant. For example, if a user is engaged in a conversation with a shopping skill (e.g., the user has made some selections for purchase), the user may want to jump to a banking skill (e.g., the user may want to ensure that he/she has enough money for the purchase), and then return to the shopping skill to complete the user's order. To address this, an action in the first skill can be configured to initiate an interaction with the second different skill in the same digital assistant and then return to the original flow.

(6) Adding custom components to the skill bot—As described above, states specified in a dialog flow for a skill bot name components that provide the functionality needed corresponding to the states. Components enable a skill bot to perform functions. In certain embodiments, DABP 102 provides a set of preconfigured components for performing a wide range of functions. A skill bot designer can select one of more of these preconfigured components and associate them with states in the dialog flow for a skill bot. The skill bot designer can also create custom or new components using tools provided by DABP 102 and associate the custom components with one or more states in the dialog flow for a skill bot.

(7) Testing and deploying the skill bot—DABP 102 provides several features that enable the skill bot designer to test a skill bot being developed. The skill bot can then be deployed and included in a digital assistant.

While the description above describes how to create a skill bot, similar techniques may also be used to create a digital assistant (or the master bot). At the master bot or digital assistant level, built-in system intents may be configured for the digital assistant. These built-in system intents are used to identify general tasks that the digital assistant itself (i.e., the master bot) can handle without invoking a skill bot associated with the digital assistant. Examples of system intents defined for a master bot include: (1) Exit: applies when the user signals the desire to exit the current conversation or context in the digital assistant; (2) Help: applies when the user asks for help or orientation; and (3) UnresolvedIntent: applies to user input that doesn't match well with the exit and help intents. The digital assistant also stores information about the one or more skill bots associated with the digital assistant. This information enables the master bot to select a particular skill bot for handling an utterance.

At the master bot or digital assistant level, when a user inputs a phrase or utterance to the digital assistant, the digital assistant is configured to perform processing to determine how to route the utterance and the related conversation. The digital assistant determines this using a routing model, which can be rules-based, AI-based, or a combination thereof. The digital assistant uses the routing model to determine whether the conversation corresponding to the user input utterance is to be routed to a particular skill for handling, is to be handled by the digital assistant or master bot itself per a built-in system intent, or is to be handled as a different state in a current conversation flow.

In certain embodiments, as part of this processing, the digital assistant determines if the user input utterance explicitly identifies a skill bot using its invocation name. If an invocation name is present in the user input, then it is treated as explicit invocation of the skill bot corresponding to the invocation name. In such a scenario, the digital assistant may route the user input to the explicitly invoked skill bot for further handling. If there is no specific or explicit invocation, in certain embodiments, the digital assistant evaluates the received user input utterance and computes confidence scores for the system intents and the skill bots associated with the digital assistant. The score computed for a skill bot or system intent represents how likely the user input is representative of a task that the skill bot is configured to perform or is representative of a system intent. Any system intent or skill bot with an associated computed confidence score exceeding a threshold value (e.g., a Confidence Threshold routing parameter) is selected as a candidate for further evaluation. The digital assistant then selects, from the identified candidates, a particular system intent or a skill bot for further handling of the user input utterance. In certain embodiments, after one or more skill bots are identified as candidates, the intents associated with those candidate skills are evaluated (according to the intent model for each skill) and confidence scores are determined for each intent. In general, any intent that has a confidence score exceeding a threshold value (e.g., 70%) is treated as a candidate intent. If a particular skill bot is selected, then the user utterance is routed to that skill bot for further processing. If a system intent is selected, then one or more actions are performed by the master bot itself according to the selected system intent.

Figure 2:
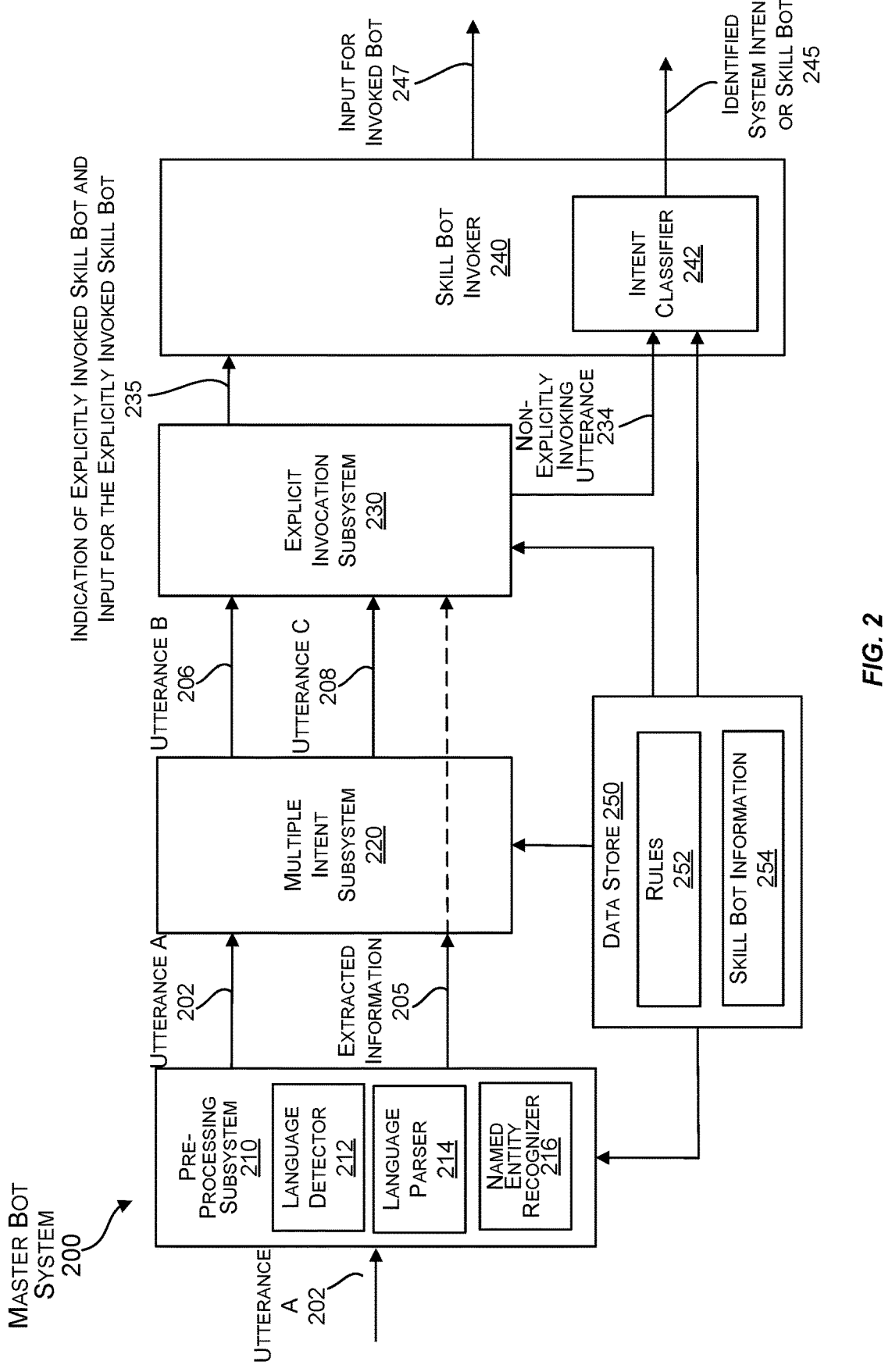
FIG. 2 is a simplified block diagram of a computing system implementing a master bot according to certain embodiments.

FIG. 2 is a simplified block diagram of a master bot (MB) system 200 according to certain embodiments. MB system 200 can be implemented in software only, hardware only, or a combination of hardware and software. MB system 200 includes a pre-processing subsystem 210, a multiple intent subsystem (MIS) 220, an explicit invocation subsystem (EIS) 230, a skill bot invoker 240, and a data store 250. MB system 200 depicted in FIG. 2 is merely an example of an arrangement of components in a master bot. One of ordinary skill in the art would recognize many possible variations, alternatives, and modifications. For example, in some implementations, MB system 200 may have more or fewer systems or components than those shown in FIG. 2, may combine two or more subsystems, or may have a different configuration or arrangement of subsystems.

Pre-processing subsystem 210 receives an utterance "A" 202 from a user and processes the utterance through a language detector 212 and a language parser 214. As indicated above, an utterance can be provided in various ways including audio or text. The utterance 202 can be a sentence fragment, a complete sentence, multiple sentences, and the like. Utterance 202 can include punctuation. For example, if the utterance 202 is provided as audio, the pre-processing subsystem 210 may convert the audio to text using a speech-to-text converter (not shown) that inserts punctuation marks into the resulting text, e.g., commas, semicolons, periods, etc.

Language detector 212 detects the language of the utterance 202 based on the text of the utterance 202. The manner in which the utterance 202 is handled depends on the language since each language has its own grammar and semantics. Differences between languages are taken into consideration when analyzing the syntax and structure of an utterance.

Language parser 214 parses the utterance 202 to extract part of speech (POS) tags for individual linguistic units (e.g., words) in the utterance 202. POS tags include, for example, noun (NN), pronoun (PN), verb (VB), and the like. Language parser 214 may also tokenize the linguistic units of the utterance 202 (e.g., to convert each word into a separate token) and lemmatize words. A lemma is the main form of a set of words as represented in a dictionary (e.g., "run" is the lemma for run, runs, ran, running, etc.). Other types of pre-processing that the language parser 214 can perform include chunking of compound expressions, e.g., combining "credit" and "card" into a single expression "credit_card." Language parser 214 may also identify relationships between the words in the utterance 202. For example, in some embodiments, the language parser 214 generates a dependency tree that indicates which part of the utterance (e.g., a particular noun) is a direct object, which part of the utterance is a preposition, and so on. The results of the processing performed by the language parser 214 form extracted information 205 and are provided as input to MIS 220 together with the utterance 202 itself.

As indicated above, the utterance 202 can include more than one sentence. For purposes of detecting multiple intents and explicit invocation, the utterance 202 can be treated as a single unit even if it includes multiple sentences. However, in certain embodiments, pre-processing can be performed, e.g., by the pre-processing subsystem 210, to identify a single sentence among multiple sentences for multiple intents analysis and explicit invocation analysis. In general, the results produced by MIS 220 and EIS 230 are substantially the same regardless of whether the utterance 202 is processed at the level of an individual sentence or as a single unit comprising multiple sentences.

Figure 3:
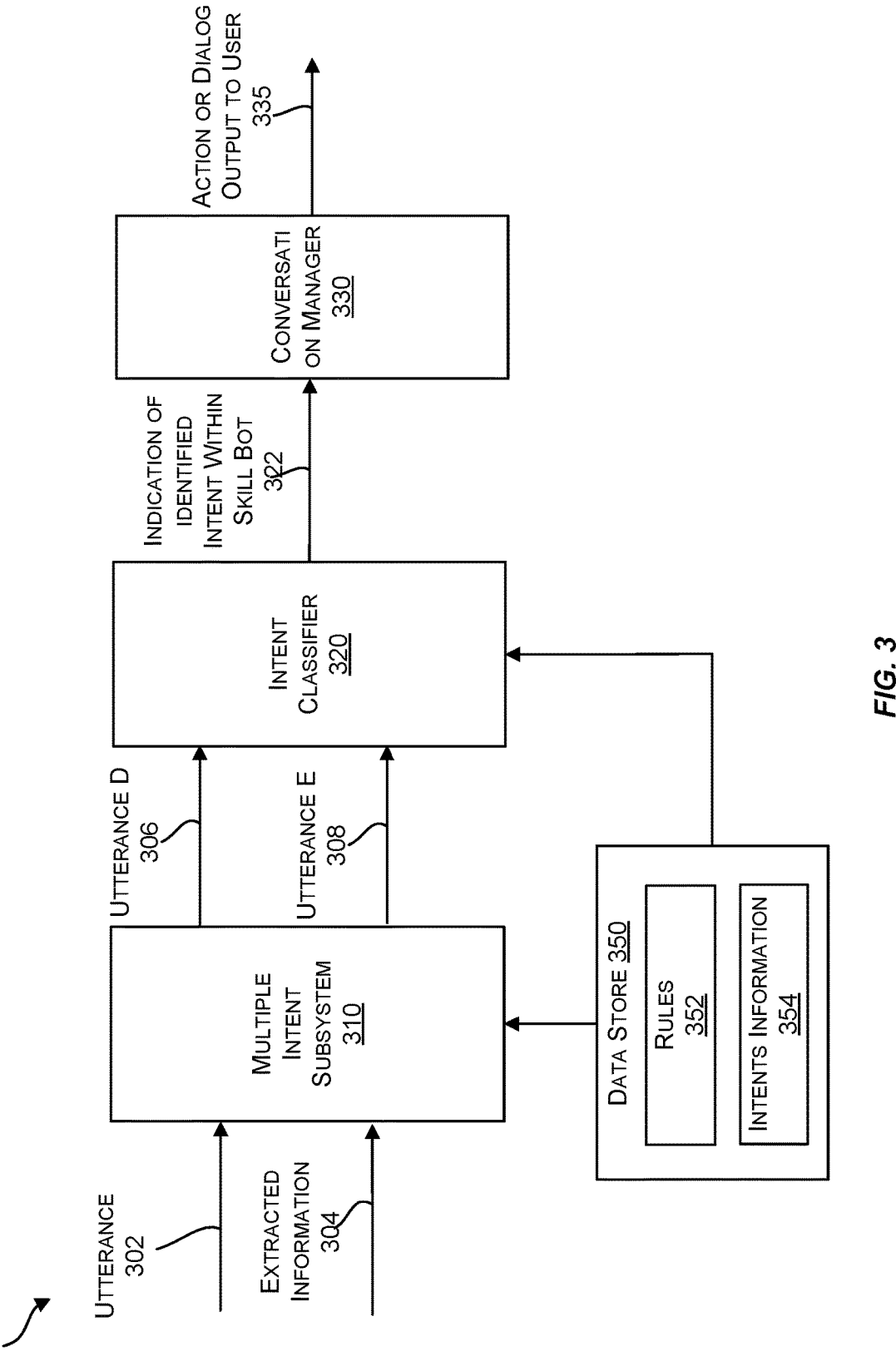
FIG. 3 is a simplified block diagram of a computing system implementing a skill bot according to certain embodiments.

MIS 220 determines whether the utterance 202 represents multiple intents. Although MIS 220 can detect the presence of multiple intents in the utterance 202, the processing performed by MIS 220 does not involve determining whether the intents of the utterance 202 match to any intents that have been configured for a bot. Instead, processing to determine whether an intent of the utterance 202 matches a bot intent can be performed by an intent classifier 242 of the MB system 200 or by an intent classifier of a skill bot (e.g., as shown in the embodiment of FIG. 3). The processing performed by MIS 220 assumes that there exists a bot (e.g., a particular skill bot or the master bot itself) that can handle the utterance 202. Therefore, the processing performed by MIS 220 does not require knowledge of what bots are in the chatbot system (e.g., the identities of skill bots registered with the master bot) or knowledge of what intents have been configured for a particular bot.

To determine that the utterance 202 includes multiple intents, the MIS 220 applies one or more rules from a set of rules 252 in the data store 250. The rules applied to the utterance 202 depend on the language of the utterance 202 and may include sentence patterns that indicate the presence of multiple intents. For example, a sentence pattern may include a coordinating conjunction that joins two parts (e.g., conjuncts) of a sentence, where both parts correspond to a separate intent. If the utterance 202 matches the sentence pattern, it can be inferred that the utterance 202 represents multiple intents. It should be noted that an utterance with multiple intents does not necessarily have different intents (e.g., intents directed to different bots or to different intents within the same bot). Instead, the utterance could have separate instances of the same intent, e.g., "Place a pizza order using payment account X, then place a pizza order using payment account Y."

As part of determining that the utterance 202 represents multiple intents, the MIS 220 also determines what portions of the utterance 202 are associated with each intent. MIS 220 constructs, for each intent represented in an utterance containing multiple intents, a new utterance for separate processing in place of the original utterance, e.g., an utterance "B" 206 and an utterance "C" 208, as depicted in FIG. 2. Thus, the original utterance 202 can be split into two or more separate utterances that are handled one at a time. MIS 220 determines, using the extracted information 205 and/or from analysis of the utterance 202 itself, which of the two or more utterances should be handled first. For example, MIS 220 may determine that the utterance 202 contains a marker word indicating that a particular intent should be handled first. The newly formed utterance corresponding to this particular intent (e.g., one of utterance 206 or utterance 208) will be the first to be sent for further processing by EIS 230. After a conversation triggered by the first utterance has ended (or has been temporarily suspended), the next highest priority utterance (e.g., the other one of utterance 206 or utterance 208) can then be sent to the EIS 230 for processing.

EIS 230 determines whether the utterance that it receives (e.g., utterance 206 or utterance 208) contains an invocation name of a skill bot. In certain embodiments, each skill bot in a chatbot system is assigned a unique invocation name that distinguishes the skill bot from other skill bots in the chatbot system. A list of invocation names can be maintained as part of skill bot information 254 in data store 250. An utterance is deemed to be an explicit invocation when the utterance contains a word match to an invocation name. If a bot is not explicitly invoked, then the utterance received by the EIS 230 is deemed a non-explicitly invoking utterance 234 and is input to an intent classifier (e.g., intent classifier 242) of the master bot to determine which bot to use for handling the utterance. In some instances, the intent classifier 242 will determine that the master bot should handle a non-explicitly invoking utterance. In other instances, the intent classifier 242 will determine a skill bot to route the utterance to for handling.

The explicit invocation functionality provided by the EIS 230 has several advantages. It can reduce the amount of processing that the master bot has to perform. For example, when there is an explicit invocation, the master bot may not have to do any intent classification analysis (e.g., using the intent classifier 242), or may have to do reduced intent classification analysis for selecting a skill bot. Thus, explicit invocation analysis may enable selection of a particular skill bot without resorting to intent classification analysis.

Also, there may be situations where there is an overlap in functionalities between multiple skill bots. This may happen, for example, if the intents handled by the two skill bots overlap or are very close to each other. In such a situation, it may be difficult for the master bot to identify which of the multiple skill bots to select based upon intent classification analysis alone. In such scenarios, the explicit invocation disambiguates the particular skill bot to be used.

In addition to determining that an utterance is an explicit invocation, the EIS 230 is responsible for determining whether any portion of the utterance should be used as input to the skill bot being explicitly invoked. In particular, EIS 230 can determine whether part of the utterance is not associated with the invocation. The EIS 230 can perform this determination through analysis of the utterance and/or analysis of the extracted information 205. EIS 230 can send the part of the utterance not associated with the invocation to the invoked skill bot in lieu of sending the entire utterance that was received by the EIS 230. In some instances, the input to the invoked skill bot is formed simply by removing any portion of the utterance associated with the invocation. For example, "I want to order pizza using Pizza Bot" can be shortened to "I want to order pizza" since "using Pizza Bot" is relevant to the invocation of the pizza bot, but irrelevant to any processing to be performed by the pizza bot. In some instances, EIS 230 may reformat the part to be sent to the invoked bot, e.g., to form a complete sentence. Thus, the EIS 230 determines not only that there is an explicit invocation, but also what to send to the skill bot when there is an explicit invocation. In some instances, there may not be any text to input to the bot being invoked. For example, if the utterance was "Pizza Bot", then the EIS 230 could determine that the pizza bot is being invoked, but there is no text to be processed by the pizza bot. In such scenarios, the EIS 230 may indicate to the skill bot invoker 240 that there is nothing to send.

Skill bot invoker 240 invokes a skill bot in various ways. For instance, skill bot invoker 240 can invoke a bot in response to receiving an indication 235 that a particular skill bot has been selected as a result of an explicit invocation. The indication 235 can be sent by the EIS 230 together with the input for the explicitly invoked skill bot. In this scenario, the skill bot invoker 240 will turn control of the conversation over to the explicitly invoked skill bot. The explicitly invoked skill bot will determine an appropriate response to the input from the EIS 230 by treating the input as a stand-alone utterance. For example, the response could be to perform a specific action or to start a new conversation in a particular state, where the initial state of the new conversation depends on the input sent from the EIS 230.

Another way in which skill bot invoker 240 can invoke a skill bot is through implicit invocation using the intent classifier 242. The intent classifier 242 can be trained, using machine-learning and/or rules-based training techniques, to determine a likelihood that an utterance is representative of a task that a particular skill bot is configured to perform. The intent classifier 242 is trained on different classes, one class for each skill bot. For instance, whenever a new skill bot is registered with the master bot, a list of example utterances associated with the new skill bot can be used to train the intent classifier 242 to determine a likelihood that a particular utterance is representative of a task that the new skill bot can perform. The parameters produced as result of this training (e.g., a set of values for parameters of a machine-learning model) can be stored as part of skill bot information 254.

In certain embodiments, the intent classifier 242 is implemented using a machine-learning model, as described in further detail herein. Training of the machine-learning model may involve inputting at least a subset of utterances from the example utterances associated with various skill bots to generate, as an output of the machine-learning model, inferences as to which bot is the correct bot for handling any particular training utterance. For each training utterance, an indication of the correct bot to use for the training utterance may be provided as ground truth information. The behavior of the machine-learning model can then be adapted (e.g., through back-propagation) to minimize the difference between the generated inferences and the ground truth information.

In certain embodiments, the intent classifier 242 determines, for each skill bot registered with the master bot, a confidence score indicating a likelihood that the skill bot can handle an utterance (e.g., the non-explicitly invoking utterance 234 received from EIS 230). The intent classifier 242 may also determine a confidence score for each system level intent (e.g., help, exit) that has been configured. If a particular confidence score meets one or more conditions, then the skill bot invoker 240 will invoke the bot associated with the particular confidence score. For example, a threshold confidence score value may need to be met. Thus, an output 245 of the intent classifier 242 is either an identification of a system intent or an identification of a particular skill bot. In some embodiments, in addition to meeting a threshold confidence score value, the confidence score must exceed the next highest confidence score by a certain win margin. Imposing such a condition would enable routing to a particular skill bot when the confidence scores of multiple skill bots each exceed the threshold confidence score value.

After identifying a bot based on evaluation of confidence scores, the skill bot invoker 240 hands over processing to the identified bot. In the case of a system intent, the identified bot is the master bot. Otherwise, the identified bot is a skill bot. Further, the skill bot invoker 240 will determine what to provide as input 247 for the identified bot. As indicated above, in the case of an explicit invocation, the input 247 can be based on a part of an utterance that is not associated with the invocation, or the input 247 can be nothing (e.g., an empty string). In the case of an implicit invocation, the input 247 can be the entire utterance.

Data store 250 comprises one or more computing devices that store data used by the various subsystems of the master bot system 200. As explained above, the data store 250 includes rules 252 and skill bot information 254. The rules 252 include, for example, rules for determining, by MIS 220, when an utterance represents multiple intents and how to split an utterance that represents multiple intents. The rules 252 further include rules for determining, by EIS 230, which parts of an utterance that explicitly invokes a skill bot to send to the skill bot. The skill bot information 254 includes invocation names of skill bots in the chatbot system, e.g., a list of the invocation names of all skill bots registered with a particular master bot. The skill bot information 254 can also include information used by intent classifier 242 to determine a confidence score for each skill bot in the chatbot system, e.g., parameters of a machine-learning model.

FIG. 3 is a simplified block diagram of a skill bot system 300 according to certain embodiments. Skill bot system 300 is a computing system that can be implemented in software only, hardware only, or a combination of hardware and software. In certain embodiments such as the embodiment depicted in FIG. 1, skill bot system 300 can be used to implement one or more skill bots within a digital assistant.

Skill bot system 300 includes an MIS 310, an intent classifier 320, and a conversation manager 330. The MIS 310 is analogous to the MIS 220 in FIG. 2 and provides similar functionality, including being operable to determine, using rules 352 in a data store 350: (1) whether an utterance represents multiple intents and, if so, (2) how to split the utterance into a separate utterance for each intent of the multiple intents. In certain embodiments, the rules applied by MIS 310 for detecting multiple intents and for splitting an utterance are the same as those applied by MIS 220. The MIS 310 receives an utterance 302 and extracted information 304. The extracted information 304 is analogous to the extracted information 205 in FIG. 1 and can be generated using the language parser 214 or a language parser local to the skill bot system 300.

Intent classifier 320 can be trained in a similar manner to the intent classifier 242 discussed above in connection with the embodiment of FIG. 2 and as described in further detail herein. For instance, in certain embodiments, the intent classifier 320 is implemented using a machine-learning model. The machine-learning model of the intent classifier 320 is trained for a particular skill bot, using at least a subset of example utterances associated with that particular skill bot as training utterances. The ground truth for each training utterance would be the particular bot intent associated with the training utterance.

The utterance 302 can be received directly from the user or supplied through a master bot. When the utterance 302 is supplied through a master bot, e.g., as a result of processing through MIS 220 and EIS 230 in the embodiment depicted in FIG. 2, the MIS 310 can be bypassed so as to avoid repeating processing already performed by MIS 220. However, if the utterance 302 is received directly from the user, e.g., during a conversation that occurs after routing to a skill bot, then MIS 310 can process the utterance 302 to determine whether the utterance 302 represents multiple intents. If so, then MIS 310 applies one or more rules to split the utterance 302 into a separate utterance for each intent, e.g., an utterance "D" 306 and an utterance "E" 308. If utterance 302 does not represent multiple intents, then MIS 310 forwards the utterance 302 to intent classifier 320 for intent classification and without splitting the utterance 302.

Intent classifier 320 is configured to match a received utterance (e.g., utterance 306 or 308) to an intent associated with skill bot system 300. As explained above, a skill bot can be configured with one or more intents, each intent including at least one example utterance that is associated with the intent and used for training a classifier. In the embodiment of FIG. 2, the intent classifier 242 of the master bot system 200 is trained to determine confidence scores for individual skill bots and confidence scores for system intents. Similarly, intent classifier 320 can be trained to determine a confidence score for each intent associated with the skill bot system 300. Whereas the classification performed by intent classifier 242 is at the bot level, the classification performed by intent classifier 320 is at the intent level and therefore finer grained. The intent classifier 320 has access to intents information 354. The intents information 354 includes, for each intent associated with the skill bot system 300, a list of utterances that are representative of and illustrate the meaning of the intent and are typically associated with a task performable by that intent. The intents information 354 can further include parameters produced as a result of training on this list of utterances.

Conversation manager 330 receives, as an output of intent classifier 320, an indication 322 of a particular intent, identified by the intent classifier 320, as best matching the utterance that was input to the intent classifier 320. In some instances, the intent classifier 320 is unable to determine any match. For example, the confidence scores computed by the intent classifier 320 could fall below a threshold confidence score value if the utterance is directed to a system intent or an intent of a different skill bot. When this occurs, the skill bot system 300 may refer the utterance to the master bot for handling, e.g., to route to a different skill bot. However, if the intent classifier 320 is successful in identifying an intent within the skill bot, then the conversation manager 330 will initiate a conversation with the user.

The conversation initiated by the conversation manager 330 is a conversation specific to the intent identified by the intent classifier 320. For instance, the conversation manager 330 may be implemented using a state machine configured to execute a dialog flow for the identified intent. The state machine can include a default starting state (e.g., for when the intent is invoked without any additional input) and one or more additional states, where each state has associated with it actions to be performed by the skill bot (e.g., executing a purchase transaction) and/or dialog (e.g., questions, responses) to be presented to the user. Thus, the conversation manager 330 can determine an action/dialog 335 upon receiving the indication 322 identifying the intent, and can determine additional actions or dialog in response to subsequent utterances received during the conversation.

Data store 350 comprises one or more computing devices that store data used by the various subsystems of the skill bot system 300. As depicted in FIG. 3, the data store 350 includes the rules 352 and the intents information 354. In certain embodiments, data store 350 can be integrated into a data store of a master bot or digital assistant, e.g., the data store 250 in FIG. 2.

Gazetteer—Neural Entity Recognition Overview

In some embodiments, named entity recognition is performed using both a neural network such as a deep learning NER subsystem 404 and gazetteer search such using elastic search subsystem 406. The deep learning NER subsystem 404 and elastic search subsystem 406 may be implemented in a chatbot system, as described with respect to FIGS. 1, 2 and 3.

Figure 4:
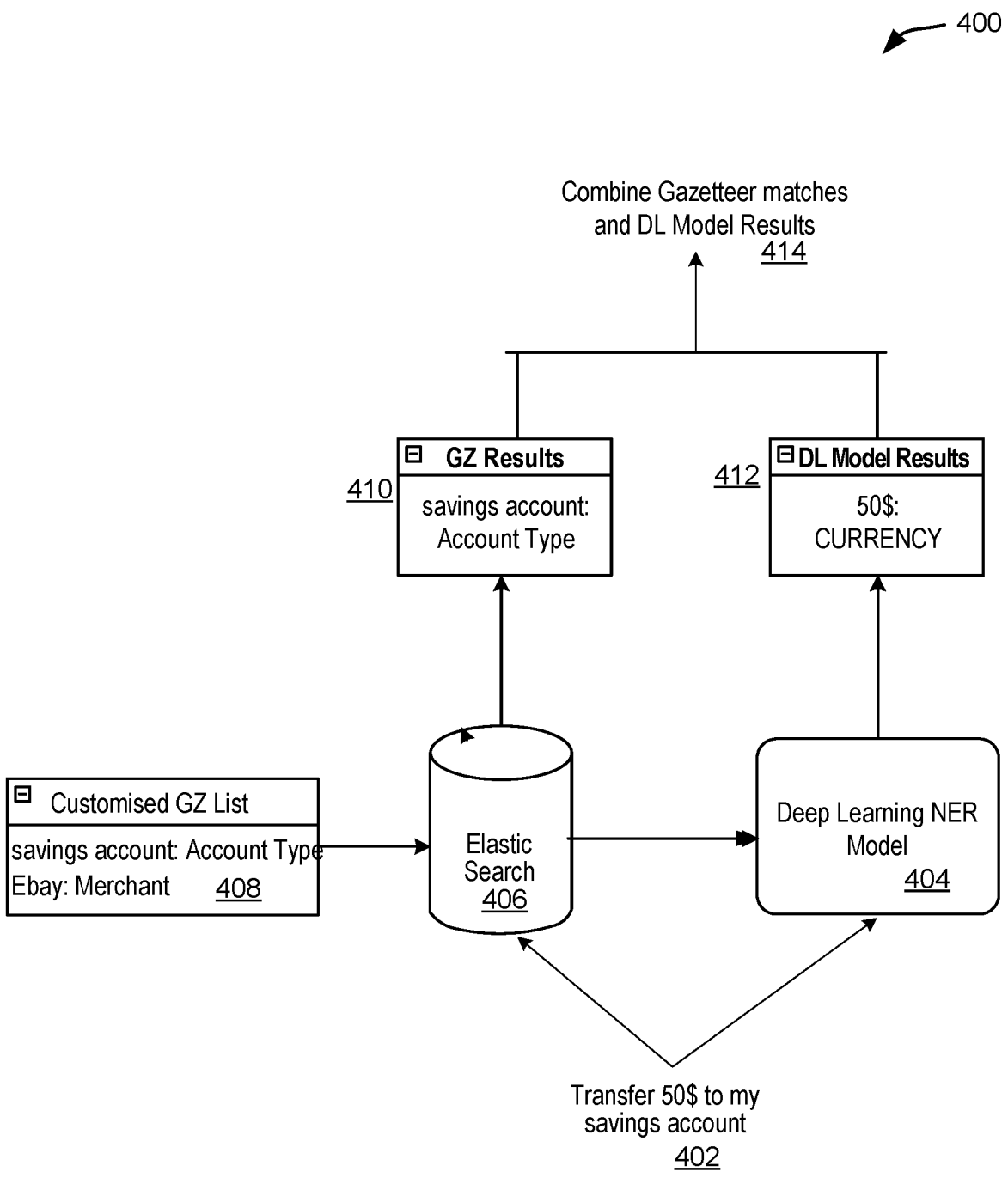
FIG. 4 is a simplified schematic diagram illustrating named entity recognition techniques using a neural network and gazetteer in accordance with various embodiments.

FIG. 4 is a simplified schematic diagram 400 illustrating named entity recognition techniques using a neural network and gazetteer in accordance with various embodiments. An input utterance 402 is provided to two subsystems, a searching subsystem such as elastic search subsystem 406, and a neural network subsystem such as deep learning NER subsystem 404. The output of the two subsystems and is combined to provide a combined result 414. In some implementations, the subsystems 404 and 406 are implemented as part of a single machine learning model.

An input utterance 402 may be text or spoken speech to be processed. For example, as illustrated in FIG. 4, the input utterance 402 is "Transfer $50 to my savings account."

The input utterance 402 may be processed by a tokenizer to produce tokens. The tokens are units of text, which may include words, parts of words, characters, or sets of words that are identified in the input utterance 402 by the tokenizer 403 (e.g., I—want—to—go—to—Jamaica, where the tokens are separated by dashes).

The input utterance 402 is provided as input to the deep learning NER subsystem 404. The deep learning NER subsystem 404 is a neural network that has been trained to identify named entities in an utterance. In some implementations, the deep learning NER subsystem 404 may be, or include, BERT (Bidirectional Encoder Representations from Transformers). Additionally or alternatively, other models such as GloVe (Global Vectors for Word Representation) may be implemented. The deep learning NER subsystem 404 may use contextual information to identify named entities in the input utterance. The deep learning NER subsystem 404 generates as output a representation of one or more named entities. The representation 412 may include a vector indicating one or more named entities identified in the input utterance 402. For example, as illustrated in FIG. 4, the deep learning NER subsystem 404 results identify $50 as named entity type CURRENCY. The output of the deep learning NER subsystem 404 may correspond to contextual features in that they are identified based on contextual information.

The input utterance 402 is also provided as input to the elastic search subsystem 406. The elastic search subsystem 406 can be configured to perform a search on a gazetteer 408 based on tokens identified in the input utterance 402. In some aspects, the elastic search subsystem 406 is a lexical matcher.

As shown in FIG. 4, the gazetteer 408 may in some implementations be a customized gazetteer (GZ) list. The customized gazetteer 408 can include named entities applicable to a certain context or use case. For example, the customized gazetteer 408 includes entries including savings account: Account type and Ebay: merchant. In some cases, for example, a customer can provide a list of terms or words that are named entities.

The elastic search subsystem 406 performs a search on the gazetteer 408 to identify any named entity labels associated with tokens identified in the input utterance 402. The elastic search subsystem 406 generates as output a representation of one or more named entities. The representation 410 may be a vector indicating one or more named entities identified in the input utterance 402.

For example, as shown in FIG. 4, the deep learning NER subsystem results 412 identify the named entity "$50" as named entity type "currency," but do not recognize "savings account" as a named entity. The gazetteer results 410 do identify the named entity "savings account" as named entity type "Account type." Thus, in some instances, the elastic search subsystem 406 and the deep learning NER subsystem 404 may identify different named entities. The gazetteer may enable additional named entities to be identified that would not be picked up using contextual data. In other situations, the gazetteer results 410 and the deep learning model results 412 may both include a particular named entity that is identified using both elastic search 406 and the deep learning NER model 404.

In some cases, the gazetteer results 410 are selected as the final recognized named entity outputs. Alternatively, or additionally, elastic search results generated by elastic search subsystem 406 are fed to the deep learning NER subsystem 404 and turned into a vector representation which is processed by the deep learning NER model 404, as described in further detail with respect to FIG. 5. The union of deep learning model results 412 and gazetteer results 410 may then be determined and provided as output at 414. In some implementations, using the gazetteer results 410 as part of the final outputs is a configurable option that can be turned on or off.

Different approaches may be implemented for the combined gazetteer—neural network architecture. In some implementations, gazetteer results are matched and encoded using a self-attention mechanism. This is concatenated with other features (such as produced using a model such as Glove, ELMO, etc.). Alternatively, or additionally, gazetteer results are encoded as an additional representation which is added to the output of a neural network such as a BiLSTM-CRF architecture. Alternatively, or additionally, gazetteers are used to perform data augmentation on existing training data.

Techniques for Gazetteer—Neural Entity Recognition

FIG. 5 is a flowchart illustrating a process 500 for named entity recognition using a gazetteer and neural network based approach according to certain embodiments. The processing depicted in FIG. 5 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 5 and described below is intended to be illustrative and non-limiting. Although FIG. 5 depicts the various processing steps occurring in a particular sequence or order, this is not intended to be limiting. In certain alternative embodiments, the steps may be performed in some different order or some steps may also be performed in parallel.

At block 502, an utterance is received. The system may, for example, receive a spoken utterance from a user via a microphone. The spoken utterance may be received as a wave form. The spoken utterance may be in a particular language and be in a natural language query form. The spoken utterance may specify a question that the user wants the system to answer, specify one or more actions that the user wants the system to initiate (e.g., "I would like a medium pepperoni pizza."), and the like. The system may process the spoken utterance to generate a text utterance for further processing.

In certain embodiments, instead of receiving a spoken utterance, input may be received in text form, for example, when a user types in text during a chat with a dialog system. The techniques described in this disclosure can be used with systems that receive input in the form of spoken speech, or text input, or combinations thereof.

At block 504, the utterance is input into a neural network comprising model parameters learned for named entity recognition, and the neural network generates a first representation of one or more named entities based on the utterance. In some implementations, the neural network is a deep learning model such as BERT which has been fine-tuned to perform entity recognition. The neural network may be trained to identify a named entity type for a token identified in the utterance. For example, the word Bermuda (a named entity) is identified as COUNTRY (named entity type). In some embodiments, the output of the neural network is a vector that represents the identified named entity type(s) in the utterance.

At block 506, a gazetteer is searched based on the utterance to generate a first representation of one or more named entities identified in the utterance. In some implementations, an elastic search is executed. The search may for example, include a keyword search and/or regular expression matching using a token identified in the utterance.

In some embodiments, the gazetteer is a list of terms or words that are named entities. The gazetteer may, for example, be provided by a customer and include terms used by the customer. The match term can act as a feature. In some aspects, the gazetteer is a cleaned and mapped gazetteer with BIO tags. The gazetteer can be an entity gazetteer including entries such as Names, Number, Organization. In some implementations, a multilingual gazetteer is used.

In some embodiments, the search is executed using regular expression matching. A regular expression (or "regex") is a sequence of characters specifying a search pattern. Advantageously, using regular expression matching may not require an exact same match, as is usually required in traditional NER models.

In some embodiments, the search is an elastic entity search process. In some aspects, the elastic search includes two roundtrips to an elastic search server. In a first roundtrip, a text search is executed on each of the tokens on a unigram index to filter out existing tokens in the value. In a second roundtrip, exact match and fuzzy match are performed. In exact match, a keyword search is executed on the candidates based on results from unigram search results. In fuzzy match, a text search is executed on the candidates based on results from unigram search result.

As an example, a search query includes token search to search for a text match. This can be used to include fuzzy entities in the search criteria. For exact match, this can be replaced to term filter. For candidate generation, tokens returned from the token search are used to build candidates based on the sequence of the tokens. As a specific example:

Example query: A B C D E F
token search result: B, C, E
   Exact Match candidate: "B", "C", "E", "B C"
   Fuzzy Match candidate: "B", "C", "E", "B C", "C E", "B C E" (up to 4 consecutive tokens).

In some aspects, sorting and scoring are applied. For an exact match, a factor of 1 may be applied (e.g., no scoring). This is sorted by the offset of matches. For overlapping matches, substrings may be ignored from matched results. For example:

Example query: A B C D E
Matched result: "A B C", "B C" "C D"
final result: "A B C", "C D" ("B C" is a substring of "A B C" and is ignored from result)

In some embodiments, searching techniques and examples can include elastic searching. Elastic searching can involve value list entity processing. For example, value list entity processing includes a text search on each of the tokens on unigram index to filter out existing tokens in the value, and includes exact matching and/or fuzzy matching operations. The exact matching operations involve a keyword search on candidates based on results from the unigram search. Additionally, the fuzzy matching operations involve a text search on candidates based on results from the unigram search. In some aspects, a fuzzy match score is calculated based on ngram string similarity. The search query includes a token search that uses text match instead of a keyword filter since there can be fuzzy entities in the search criteria. In examples involving an exact match, this can be replaced with a term filter.

Tokens returned from the token search can be used to build candidates based on the sequence of the tokens. For example, a query can include A, B, C, D, E, and F, and the token search results can include B, C, and E. In this example, the exact match candidates are "B", "C", "E", and "B C." Additionally, the fuzzy match candidates are "B", "C", "E", "B C", "C E", and "B C E," etc. (e.g., up to 4 consecutive tokens).

For the exact match candidates, scoring may be determining whether each match candidate is zero or one. The resulting scores are sorted by the offset of matches. For overlapping matches, substrings are ignored from matched results. Example query: A, B, C, D, and E. The matched results can be "A B C," "B C," and "C D." The adjusted results can include "A B C," "C D," (e.g., "B C" is a substring of "A B C" and is ignored from result).

In some embodiments, named entity types identified using the search are encoded into a vector representation of the entity or entities identified. For example, one-hot encoding or multi-hot encoding is used to encode the named entities to a vector representation. In either, a position of the tokens in a respective vector representation may be tracked.

Multi-hot encoding can allow similar or overlapping words that can be matched by a different entity type to be represented, for example via a multi-hot encoding vector.

One-hot encoding is based on, and may be a special circumstance of, multi-hot encoding. For example, one-hot encoding can only have one non-zero value in a single vector. Since multi-hot encoding can include more than one non-zero value, then a multi-hot encoding vector can represent more than one person, location, and/or the like, whereas one-hot encoding cannot.

In some embodiments, multi-hot encoding is used. A token relative position in the Gazetteer/Regex matched string is encoded. In particular, we consider: B (first token in the multi-tokens string, only for first subword), I (middle tokens, only for first subword), L (last token, only for first subword), U (single token, only for first subword), X (2nd subword token onward). Advantageously, this encoding scheme allows for overlapping matches. For example, for the phrase "50 dollars," 50 may be matched to multiple named entity types, such as currency and number. This encoding scheme, unlike many others, supports such overlapping.

As a specific example, the following named entity types are included in the gazetteer/regex dictionary:

Gazetteer List

London, LOCATION
Kara Hines, PERSON
Donald Hernandez, PERSON
The multi-hot encoding vector will look like:

$$\underbrace{(v1, v2, v3, v4, v5,}_{\text{PERSON}} \underbrace{v6, v7, v8, v9, 10)}_{\text{LOCATION}}$$

where v1, v2, v3, v4, v5 corresponds to B, I, L, U, X respectively and $v_i=1$ if the token matches the Named Entity Type and position, and $v_i=0$ otherwise. For example, the multi-hot encoding vector is a ten-dimensional vector that includes a combination of zeroes and ones. The multi-hot encoding vector for a particular token can be a unit vector (e.g., one position of the multi-hot encoding vector is "1" and the remaining are "0") if the particular token corresponds to a noun. In some embodiments, if the particular token does not correspond to a noun, the multi-hot encoding vector may be zero. Given the above Gazetteer List, if the input utterance is "Kara Hines travels to London," the following multi-hot encoding vectors may be generated:

Tokens: Ka, #ra, Hi, #nes, travels, to, Lon, #don
Ka→(1, 0, 0, 0, 0, 0, 0, 0, 0, 0) (Ka is the first subword of the first token in Gazetteer string Kara Hines of PERSON type)
ra:→(0, 0, 0, 0, 1, 0, 0, 0, 0, 0) (the 2nd subword of the first token in Gazetteer string Kara Hines of PERSON type)
Hi→(0, 0, 1, 0, 0, 0, 0, 0, 0, 0) (the 1st subword of the Last token in Gazetteer string Kara Hines of PERSON type)
nes→(0, 0, 0, 0, 1, 0, 0, 0, 0, 0) (the 2nd subword of the Last token in Gazetteer string Kara Hines of PERSON type)
travels→(0, 0, 0, 0, 0, 0, 0, 0, 0, 0) (not matched by any Gazetteer string)
to→(0, 0, 0, 0, 0, 0, 0, 0, 0, 0) (not matched by any Gazetteer string)
Lon→(0, 0, 0, 0, 0, 0, 0, 0, 1, 0) (the first subword of the single token in Gazetteer string London of LOCATION type)

don→(0, 0, 0, 0, 0, 0, 0, 0, 0, 1) (the 2nd subword of the single token in Gazetteer string London of LOCATION type).

The multi-hot encoding representation (e.g., the second named entity representation) can then be output for further processing at block 508.

At block 508, the first named entity representation is combined with the second named entity representation to generate a combined named entity representation. In some implementations, the first representation generated at 504 and the second representation generated at 506 are input into a conditional random field (CRF) layer configured to produce a final prediction. In some implementations, the first named entity representation (e.g., lexical features from BERT) are combined with the second named entity representation (e.g., gazetteer features) using one or more of concatenation, interpolation, or attention. In some implementations, multi-hot vectors generated at 506 are provided to a fully connected layer to generate a continuous representation which is combined with the contextual representation generated at 504.

In some embodiments, concatenation is used to combine the representations generated at 504 and 506. For example, the first entity representation is a 768 dimensional vector output by BERT and the second entity representation is a 128 dimensional gazetteer feature vector. These vectors are concatenated, resulting in a combined named entity representation which is a vector of 896 dimensions.

In some embodiments, interpolation is used to combine the representations generated at 504 and 506. A weighted linear combination between the gazetteer feature vectors and the contextual representation vectors, which may be weighted, are learned. Weighted linear interpolation may, for example, be given by:

$$\text{output}=\text{BERT}+W*GZ_{feature} \qquad \text{(Equation 1)}$$

where BERT is the first representation generated at 504, $GZ_{feature}$ is the second representation generated at 506, W is a projection layer configured to project from 128 dimensions to 768 dimensions, and output is the combined representation, which may be or include a vector of 768 dimensions.

In some embodiments, an attention method is used to combine the representations generated at 504 and 506. For example, a sequence of attention vectors is computed from a sequence of BERT vectors and projected gazetteer features, which is used to combine the representations.

Approaches for tuning Gazetteer/Regex (GZ/RX) features and/or incorporating a gazetteer and neural NER system can involve Gazetteer/Regex (GZ/RX) coverage. GZ/RX coverage can involve tracking an amount of terms that match the GZ/RX feature. For example, without tracking and maintaining GZ/RX coverage, a matching (or coverage) rate can be 0%. Accordingly, a threshold coverage rate (e.g., 80% or other suitable rate) can be set. For example, if the actual coverage rate is less than the threshold coverage rate, additional named entities can be added to training data and/or to the gazetteer list to improve performance of the neural NER system.

At block 510, the combined named entity representation is output for facilitating a response to the user. Facilitating a response may include further processing such as additional language processing, dialog tasks, or other tasks. For example, the system may determine a logical form based upon an identified entity. The system may further use additional words discerned from the speech input in determining the logical form (e.g., for tasks such as disambiguation and slot filling). The system may determine an intent for the utterance. For example, a set of rules may assign a book travel intent if the utterance includes the words "book" or "purchase" along with "flight" or "car" or "train." The system may fill slots based upon words identified in the utterance (e.g., the dialog system may assign pepperoni to a toppings slot).

In some embodiments, facilitating the response can involve classifying the combined named entity representation into a type of entity. A CRF layer can be used to make the classification. The combined named entity representation can be input into a separate model that is configured to make predictions about the type of entity (e.g., name, person, location, etc.) based on an input named entity representation.

In some implementations, the system generates a speech or text response based upon the named entity and logical form identified. In some embodiments, the system prepares a response that approximates a natural conversation with a person. The system may add explanatory phrases to the values to do so. The response may include a value (e.g., "The shoes cost $50," where $50 is the identified value). Alternatively, or additionally, the response may include information prepared based upon an identified value (e.g., the system retrieves the value IN_STOCK, and returns the output "Yes, we have a red Ferrari available."). The system may generate and output a text response. The system may alternatively or additionally generate speech output. The system may output the text response to the text-to speech subsystem which converts the text response to a speech response.

In some embodiments, the system provides the speech response as output. The system may output a spoken response as speech output. Alternatively, or additionally, the output response may be presented as text (e.g., a text response can be output via a visual output device such as a screen). In some embodiments, the system may further execute a task corresponding to the identified entity or entities. For example, the system may place a food order, book a flight, and so forth.

In some embodiments, before the processing of FIG. 5, a training process is performed. The training may be based on both gazetteer output and contextual output. For example, a training data set is accessed. The training data set may include a set of labels, where each label corresponds to an input data set used to train the machine-learning model. Additionally or alternatively, the training data set includes pairs of input data sets (e.g., sample utterances) and corresponding labels.

The training may include accessing a training utterance (e.g., a set of training utterances). The training utterance is input into the neural network, and the neural network generates a first training representation based on the utterance. The gazetteer is searched based on the training utterance to generate a second training representation. The machine-learning model is trained based on the first training representation and the second training representation.

The training can include processing each of one or more training data elements (e.g., input utterances or corresponding encodings) using a current version of the model to generate a prediction, calculating a loss based on the prediction and a label corresponding to the data element, and updating one or more parameters of the model based on the loss. In order to generate the prediction, multiple intermediate values may be generated for each training data element. For example, an intermediate value may include an output from a layer in the model. Each layer may generate multiple outputs (e.g., over 100, over 1,000, over 10,000, or over 100,000 outputs). In some instances, the model in its entirety is configured to generate a consistent output so long as an input is the same, the model's hyperparameters are the same, and the model's parameters are the same. Once training is complete, a trained machine-learning model is the result, which can be or can be part of an entity recognition model.

In some embodiments, dropout is applied during training. In some aspects, lexical dropout is applied based on the combined output of the two models. Using lexical dropout, the model (e.g., a combined machine learning model including deep learning NER subsystem 404, elastic search subsystem 406, and in some implementations, a CRF layer to combine the output of the two) is taught to focus more on the gazetteer features. At one extreme, where the lexical dropout=100%, the model is forced to rely fully on the gazetteer feature. The difference between lexical and standard dropout is that lexical dropout set the zero-vector for lexical vector (i.e., all 768 dimensions for BERT) while standard dropout masks some dimensions from that 768.

In some embodiments, a dropout parameter is identified. The dropout parameter may be a hyperparameter of the machine learning model. The hyperparameters are settings that can be tuned or optimized to control the behavior of the model. In some implementations, the dropout parameter is a dropout rate. For example, a dropout parameter p represents a probability of dropout on a given training iteration. The dropout can be controlled using the dropout rate.

The contextual feature embeddings vectors of those tokens matched by gazetteer features can be dropped out further during the training process by using a separately configurable and higher dropout rate for tokens that are matched by gazetteer features ("Targeted Lexical Dropout"). The gazetteer matched token embeddings are dropped out using this "Targeted Lexical Dropout rate" while the remaining tokens are dropout using the "Standard Lexical Dropout rate" above. Experimental results indicate a "Targeted Lexical Dropout rate" that is much higher than the "Standard Lexical Dropout rate" (0.21 vs 0.01) provide accurate predictions.

In some embodiments, tokens matched by the gazetteer are assigned different dropout rate compared to other tokens (e.g., the gazetteer-matched tokens are assigned a higher dropout rate). This can cause the model to rely more on the contextual vectors generated by the neural network than the multi-hot encodings based on the gazetteer. Assigning a higher dropout rate to the feature vector matched to the gazetteer can cause the model to cause the model to rely on contextual features more. In some cases, the model might overfit on gazetteer features (e.g., every time it sees a Person gazetteer match, it will predict Person). The same lexical and standard dropout as above can be applied for the Gazetteer features. For example, if the gazetteer feature dropout rate is set to 100%, the model completely ignores the gazetteer feature.

In some implementations, a gazetteer layer is used (e.g., via gazetteer embeddings). This may cause the model to overfit to those gazetteer embeddings and ignore the sentence-contextualized embeddings. To avoid this, the appropriate dropout technique can be applied for gazetteer embeddings. Dropout techniques can include lexical dropout, targeted lexical dropout, and GZ/RX feature dropout.

Lexical dropout can involve teaching the neural NER model to focus more on the GZ/RX features. The final feature of the neural NER model can be a function of lexical feature (e.g., from BERT) and GZ/RX feature. In some embodiments, if the lexical dropout is 100%, the model may rely only on the GZ/RX feature instead of some combination of the GZ/RX feature and the contextual feature. The lexical dropout can be controlled by setting the lexical dropout rate to adjust a focus of the neural NER model on the GZ/RX features. One difference between lexical dropout and standard dropout can be that lexical dropout sets the zero-vector for lexical vector (e.g., all 768 dimensions for BERT), while standard dropout masks some dimensions from that 768.

Targeted lexical dropout can involve targeting particular features or types of features to dropout at particular rates. Having the neural NER model emphasize more on learning how to use the RX/GZ features may improve the performance of the neural NER model. The contextual feature embeddings vectors of the tokens matched by RX/GZ features can be dropped out further during the training process, and this can translate to having a separated, configurable, and higher dropout rate for tokens that are matched by RX/GZ features. In some embodiments, the RX/GZ matched token embeddings can be dropped out using targeted lexical dropout, while the remaining tokens are dropped out using the lexical dropout rate, as previously discussed.

GZ/RX feature dropout can involve dropping particular features. The neural NER model may overfit on GZ/RX features. For example, every instance the neural NER model encounters a "person" gazetteer match, the neural NER model may predict "person." The lexical dropout and standard dropout can be applied as previously discussed but also applied for the GZ/RX features. The GZ/RX features dropout type (e.g., standard or lexical) can be adjusted by setting a gazetteer layer dropout rate. If the rate is set to 100%, the neural NER model may ignore the GZ/RX feature.

Additional training techniques may include gazetteer/regex feature tuning. For example, the coverage for a gazetteer list, e.g., a "Person" gazetteer/regex list, is the percentage of words with gold label=Person and matches the gazetteer. At one extreme where the none of the gazetteer or regex features match the training data (i.e., coverage=0%), the model will not learn anything. The coverage for gazetteer can be controlled, e.g., by setting a coverage rate for the gazetteer layer. If the coverage rate is set to, e.g., 80%, it will automatically add some named entities (such as Person) in the training data to add to the Gazetteer list. Regex coverage may be controlled by writing regular expressions based on the training data.

Additional training techniques may include noise control. Noise control can be used to control the case where gazetteer features are matched which are different than the ground truth. For example, "Person" is matched by the gazetteer, but the ground truth is not Person. For example, for the utterance "Please mark the exams by January," "mark" is matched in the Person gazetteer list but has "O" as the ground truth.

At one extreme, where the Person gazetteer list contains very common English word person names such as "An" or "The," there will be a great deal of noise in the training regarding the gazetteer features. At another extreme, where we don't have any noise, it is usually the case where the GZ/RX is very high in precision and but low recall, the model won't generalize well. To address these, a mechanism is used to control the level of tolerable noise. A noise value is computed as:

$$noise = \frac{a}{(a+b)} \qquad \text{(Equation 2)}$$

where a is the number of violating words (e.g., having a person gazetteer feature, but ground truth is not PERSON), and b is the number of conforming words (e.g., having PERSON as the gazetteer features and ground truth is PERSON. Initially without any noise control, the noise level might be:

$$noise = \frac{3000}{(3,000+17,000)} = 15\% \qquad \text{(Equation 3)}$$

To reduce to, e.g., ~5% noise, the number of violations may be more on the order of a ~1000. The number of violations can be reduced using lexical dropout of gazetteer features. For example, removing the gazetteer features can remove the violation.

The techniques described herein can improve the results of NER tasks by appropriate combination of gazetteer and neural network based results. Key features of these techniques include using regex match and exact string match for the gazetteer search. Another key feature is combining gazetteer/regex features with contextual features using interpolation. Another key feature is using multi-hot encoding to distinguish a relative position of the tokens (B, I, L, U) and differentiate first-subword vs the rest of the subwords in any given word. The first point is important because for word with multiple meaning such as Little (being small vs being a person name), it can help to disambiguate especially when our model do not consider case information. For example, when the token "Little" is matched as U (single token), it is less likely to be a person name comparing to when it is matched as "L" or "I" (in "John Little"). The second point is important because the current NER model uses the predicted tag for the first token as the tag for the entire word.

Illustrative Systems

FIG. 6 depicts a simplified diagram of a distributed system 600. In the illustrated example, distributed system 600 includes one or more client computing devices 602, 604, 606, and 608, coupled to a server 612 via one or more communication networks 610. Clients computing devices 602, 604, 606, and 608 may be configured to execute one or more applications.

In various examples, server 612 may be adapted to run one or more services or software applications that enable one or more embodiments described in this disclosure. In certain examples, server 612 may also provide other services or software applications that may include non-virtual and virtual environments. In some examples, these services may be offered as web-based or cloud services, such as under a Software as a Service (SaaS) model to the users of client computing devices 602, 604, 606, and/or 608. Users operating client computing devices 602, 604, 606, and/or 608 may in turn utilize one or more client applications to interact with server 612 to utilize the services provided by these components.

In the configuration depicted in FIG. 6, server 612 may include one or more components 618, 620 and 622 that implement the functions performed by server 612. These components may include software components that may be executed by one or more processors, hardware components, or combinations thereof. It should be appreciated that various different system configurations are possible, which may be different from distributed system 600. The example shown in FIG. 6 is thus one example of a distributed system for implementing an example system and is not intended to be limiting.

Users may use client computing devices 602, 604, 606, and/or 608 to execute one or more applications, models or chatbots, which may generate one or more events or models that may then be implemented or serviced in accordance with the teachings of this disclosure. A client device may provide an interface that enables a user of the client device to interact with the client device. The client device may also output information to the user via this interface. Although FIG. 6 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 610 may be any type of network familiar to those skilled in the art that may support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 610 may be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 612 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 612 may include one or more virtual machines running virtual operating systems, or other computing architectures involving virtualization such as one or more flexible pools of logical storage devices that may be virtualized to maintain virtual storage devices for the server. In various examples, server 612 may be adapted to run one or more services or software applications that provide the functionality described in the foregoing disclosure.

The computing systems in server 612 may run one or more operating systems including any of those discussed above, as well as any commercially available server operating system. Server 612 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 612 may include one or more applications to analyze and consolidate data feeds and/or event updates received from users of client computing devices 602, 604, 606, and 608. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 612 may also include one or more applications to display the data feeds and/or real-time events via one or more display devices of client computing devices 602, 604, 606, and 608.

Distributed system 600 may also include one or more data repositories 614, 616. These data repositories may be used to store data and other information in certain examples. For example, one or more of the data repositories 614, 616 may be used to store information such as information related to chatbot performance or generated models for use by chatbots used by server 612 when performing various functions in accordance with various embodiments. Data repositories 614, 616 may reside in a variety of locations. For example, a data repository used by server 612 may be local to server 612 or may be remote from server 612 and in communication with server 612 via a network-based or dedicated connection. Data repositories 614, 616 may be of different types. In certain examples, a data repository used by server 612 may be a database, for example, a relational database, such as databases provided by Oracle Corporation® and other vendors. One or more of these databases may be adapted to enable storage, update, and retrieval of data to and from the database in response to SQL-formatted commands.

In certain examples, one or more of data repositories 614, 616 may also be used by applications to store application data. The data repositories used by applications may be of different types such as, for example, a key-value store repository, an object store repository, or a general storage repository supported by a file system.

Figure 7:
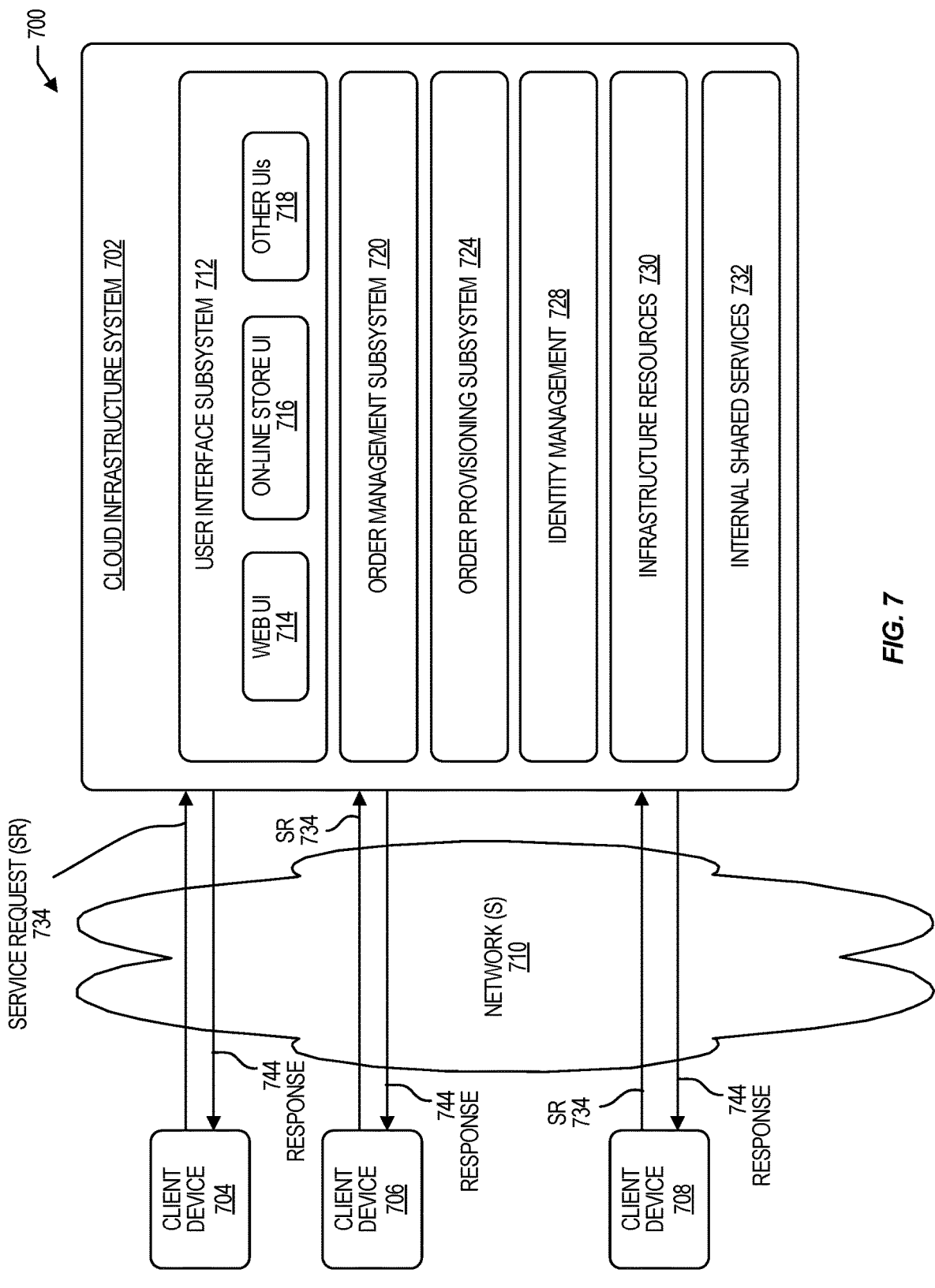
FIG. 7 is a simplified block diagram of one or more components of a system environment by which services provided by one or more components of an embodiment system may be offered as cloud services, in accordance with various embodiments.

In certain examples, the functionalities described in this disclosure may be offered as services via a cloud environment. FIG. 7 is a simplified block diagram of a cloud-based system environment in which various services may be offered as cloud services in accordance with certain examples. In the example depicted in FIG. 7, cloud infrastructure system 702 may provide one or more cloud services that may be requested by users using one or more client computing devices 704, 706, and 708. Cloud infrastructure system 702 may comprise one or more computers and/or servers that may include those described above for server 612. The computers in cloud infrastructure system 702 may be organized as general purpose computers, specialized server computers, server farms, server clusters, or any other appropriate arrangement and/or combination.

Network(s) 710 may facilitate communication and exchange of data between clients 704, 706, and 708 and cloud infrastructure system 702. Network(s) 710 may include one or more networks. The networks may be of the same or different types. Network(s) 710 may support one or more communication protocols, including wired and/or wireless protocols, for facilitating the communications.

The example depicted in FIG. 7 is only one example of a cloud infrastructure system and is not intended to be limiting. It should be appreciated that, in some other examples, cloud infrastructure system 702 may have more or fewer components than those depicted in FIG. 7, may combine two or more components, or may have a different configuration or arrangement of components. For example, although FIG. 7 depicts three client computing devices, any number of client computing devices may be supported in alternative examples.

The term cloud service is generally used to refer to a service that is made available to users on demand and via a communication network such as the Internet by systems (e.g., cloud infrastructure system 702) of a service provider. Typically, in a public cloud environment, servers and systems that make up the cloud service provider's system are different from the customer's own on-premise servers and systems. The cloud service provider's systems are managed by the cloud service provider. Customers may thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, California, such as middleware services, database services, Java cloud services, and others.

In certain examples, cloud infrastructure system 702 may provide one or more cloud services using different models such as under a Software as a Service (SaaS) model, a Platform as a Service (PaaS) model, an Infrastructure as a Service (IaaS) model, and others, including hybrid service models. Cloud infrastructure system 702 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 702. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 702. Cloud infrastructure system 702 then performs processing to provide the services requested in the customer's subscription order. For example, a user may use utterances to request the cloud infrastructure system to take a certain action (e.g., an intent), as described above, and/or provide services for a chatbot system as described herein. Cloud infrastructure system 702 may be configured to provide one or even multiple cloud services.

Cloud infrastructure system 702 may provide the cloud services via different deployment models. In a public cloud model, cloud infrastructure system 702 may be owned by a third party cloud services provider and the cloud services are offered to any general public customer, where the customer may be an individual or an enterprise. In certain other examples, under a private cloud model, cloud infrastructure system 702 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other examples, under a community cloud model, the cloud infrastructure system 702 and the services provided may be shared by several organizations in a related community. Various other models such as hybrids of the above mentioned models may also be used.

Client computing devices 704, 706, and 708 may be of different types (such as client computing devices 602, 604, 606, and 608 depicted in FIG. 6) and may be capable of operating one or more client applications. A user may use a client device to interact with cloud infrastructure system 702, such as to request a service provided by cloud infrastructure system 702. For example, a user may use a client device to request information or action from a chatbot as described in this disclosure.

In some examples, the processing performed by cloud infrastructure system 702 for providing services may involve model training and deployment. This analysis may involve using, analyzing, and manipulating data sets to train and deploy one or more models. This analysis may be performed by one or more processors, possibly processing the data in parallel, performing simulations using the data, and the like. For example, big data analysis may be performed by cloud infrastructure system 702 for generating and training one or more models for a chatbot system. The data used for this analysis may include structured data (e.g., data stored in a database or structured according to a structured model) and/or unstructured data (e.g., data blobs (binary large objects)).

As depicted in the example in FIG. 7, cloud infrastructure system 702 may include infrastructure resources 730 that are utilized for facilitating the provision of various cloud services offered by cloud infrastructure system 702. Infrastructure resources 730 may include, for example, processing resources, storage or memory resources, networking resources, and the like. In certain examples, the storage virtual machines that are available for servicing storage requested from applications may be part of cloud infrastructure system 702. In other examples, the storage virtual machines may be part of different systems.

In certain examples, to facilitate efficient provisioning of these resources for supporting the various cloud services provided by cloud infrastructure system 702 for different customers, the resources may be bundled into sets of resources or resource modules (also referred to as "pods"). Each resource module or pod may comprise a pre-integrated and optimized combination of resources of one or more types. In certain examples, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 702 may itself internally use services 732 that are shared by different components of cloud infrastructure system 702 and which facilitate the provisioning of services by cloud infrastructure system 702. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 702 may comprise multiple subsystems. These subsystems may be implemented in software, or hardware, or combinations thereof. As depicted in FIG. 7, the subsystems may include a user interface subsystem 712 that enables users or customers of cloud infrastructure system 702 to interact with cloud infrastructure system 702. User interface subsystem 712 may include various different interfaces such as a web interface 714, an online store interface 716 where cloud services provided by cloud infrastructure system 702 are advertised and are purchasable by a consumer, and other interfaces 718. For example, a customer may, using a client device, request (service request 734) one or more services provided by cloud infrastructure system 702 using one or more of interfaces 714, 716, and 718. For example, a customer may access the online store, browse cloud services offered by cloud infrastructure system 702, and place a subscription order for one or more services offered by cloud infrastructure system 702 that the customer wishes to subscribe to. The service request may include information identifying the customer and one or more services that the customer desires to subscribe to. For example, a customer may place a subscription order for a service offered by cloud infrastructure system 702. As part of the order, the customer may provide information identifying a chatbot system for which the service is to be provided and optionally one or more credentials for the chatbot system.

In certain examples, such as the example depicted in FIG. 7, cloud infrastructure system 702 may comprise an order management subsystem (OMS) 720 that is configured to process the new order. As part of this processing, OMS 720 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 720 may then invoke the order provisioning subsystem (OPS) 724 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 724 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

In certain examples, setup phase processing, as described above, may be performed by cloud infrastructure system 702 as part of the provisioning process. Cloud infrastructure system 702 may generate an application ID and select a storage virtual machine for an application from among storage virtual machines provided by cloud infrastructure system 702 itself or from storage virtual machines provided by other systems other than cloud infrastructure system 702.

Cloud infrastructure system 702 may send a response or notification 744 to the requesting customer to indicate when the requested service is now ready for use. In some instances, information (e.g., a link) may be sent to the customer that enables the customer to start using and availing the benefits of the requested services. In certain examples, for a customer requesting the service, the response may include a chatbot system ID generated by cloud infrastructure system 702 and information identifying a chatbot system selected by cloud infrastructure system 702 for the chatbot system corresponding to the chatbot system ID.

Cloud infrastructure system 702 may provide services to multiple customers. For each customer, cloud infrastructure system 702 is responsible for managing information related to one or more subscription orders received from the customer, maintaining customer data related to the orders, and providing the requested services to the customer. Cloud infrastructure system 702 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 702 may provide services to multiple customers in parallel. Cloud infrastructure system 702 may store information for these customers, including possibly proprietary information. In certain examples, cloud infrastructure system 702 comprises an identity management subsystem (IMS) 728 that is configured to manage customer information and provide the separation of the managed information such that information related to one customer is not accessible by another customer. IMS 728 may be configured to provide various security-related services such as identity services, such as information access management, authentication and authorization services, services for managing customer identities and roles and related capabilities, and the like.

Figure 8:
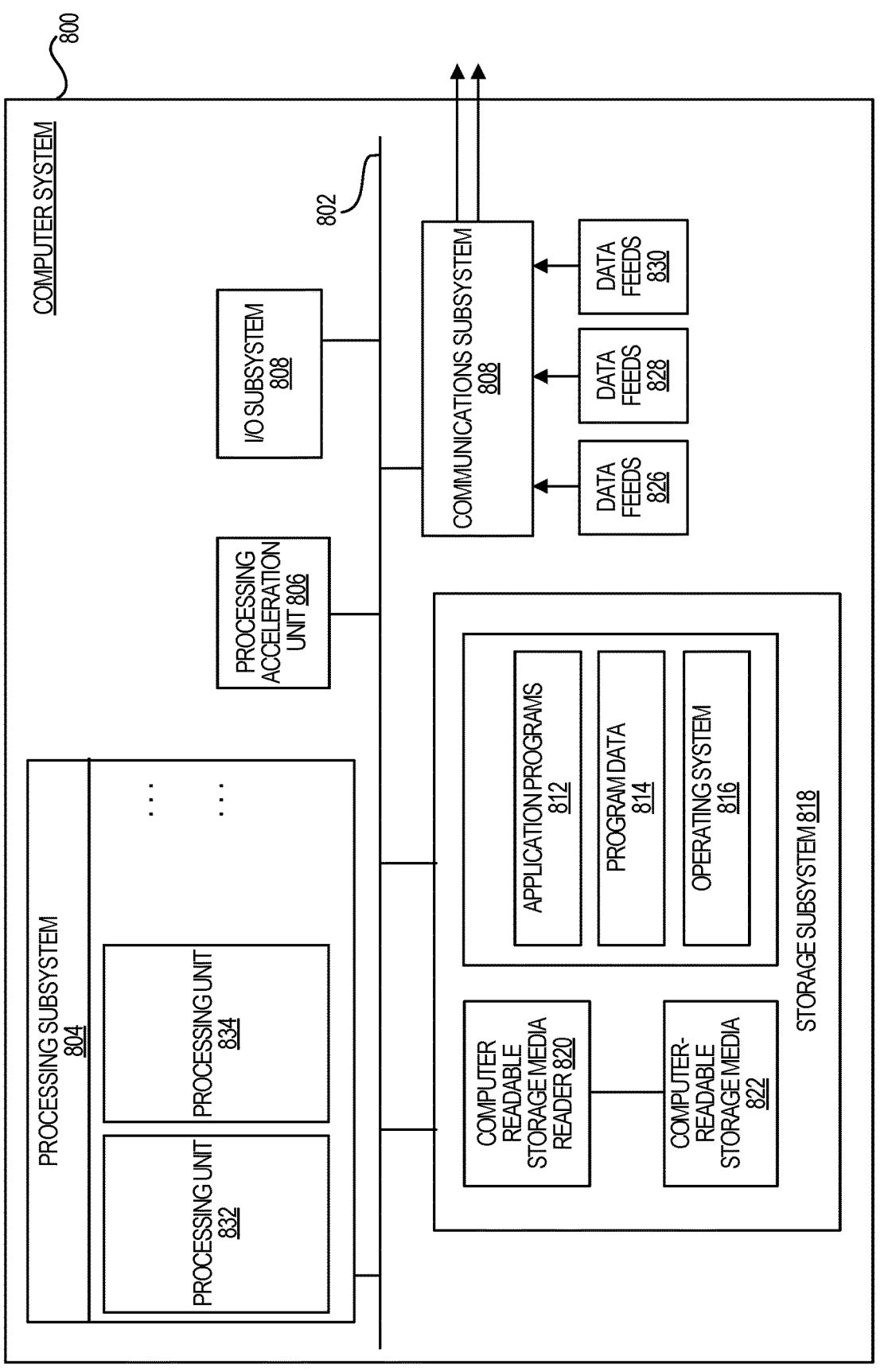
FIG. 8 illustrates an example computer system that may be used to implement various embodiments.

FIG. 8 illustrates an example of computer system 800. In some examples, computer system 800 may be used to implement any of the digital assistant or chatbot systems within a distributed environment, and various servers and computer systems described above. As shown in FIG. 8, computer system 800 includes various subsystems including a processing subsystem 804 that communicates with a number of other subsystems via a bus subsystem 802. These other subsystems may include a processing acceleration unit 806, an I/O subsystem 808, a storage subsystem 818, and a communications subsystem 824. Storage subsystem 818 may include non-transitory computer-readable storage media including storage media 822 and a system memory 810.

Bus subsystem 802 provides a mechanism for letting the various components and subsystems of computer system 800 communicate with each other as intended. Although bus subsystem 802 is shown schematically as a single bus, alternative examples of the bus subsystem may utilize multiple buses. Bus subsystem 802 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which may be implemented as a Mezzanine bus manufactured to the IEEE P1386.1 standard, and the like.

Processing subsystem 804 controls the operation of computer system 800 and may comprise one or more processors, application specific integrated circuits (ASICs), or field programmable gate arrays (FPGAs). The processors may include be single core or multicore processors. The processing resources of computer system 800 may be organized into one or more processing units 832, 834, etc. A processing unit may include one or more processors, one or more cores from the same or different processors, a combination of cores and processors, or other combinations of cores and processors. In some examples, processing subsystem 804 may include one or more special purpose co-processors such as graphics processors, digital signal processors (DSPs), or the like. In some examples, some or all of the processing units of processing subsystem 804 may be implemented using customized circuits, such as application specific integrated circuits (ASICs), or field programmable gate arrays (FPGAs).

In some examples, the processing units in processing subsystem 804 may execute instructions stored in system memory 810 or on computer readable storage media 822. In various examples, the processing units may execute a variety of programs or code instructions and may maintain multiple concurrently executing programs or processes. At any given time, some or all of the program code to be executed may be resident in system memory 810 and/or on computer-readable storage media 822 including potentially on one or more storage devices. Through suitable programming, processing subsystem 804 may provide various functionalities described above. In instances where computer system 800 is executing one or more virtual machines, one or more processing units may be allocated to each virtual machine.

In certain examples, a processing acceleration unit 806 may optionally be provided for performing customized processing or for off-loading some of the processing performed by processing subsystem 804 so as to accelerate the overall processing performed by computer system 800.

I/O subsystem 808 may include devices and mechanisms for inputting information to computer system 800 and/or for outputting information from or via computer system 800. In general, use of the term input device is intended to include all possible types of devices and mechanisms for inputting information to computer system 800. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 800 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 818 provides a repository or data store for storing information and data that is used by computer system 800. Storage subsystem 818 provides a tangible non-transitory computer-readable storage medium for storing the basic programming and data constructs that provide the functionality of some examples. Storage subsystem 818 may store software (e.g., programs, code modules, instructions) that when executed by processing subsystem 804 provides the functionality described above. The software may be executed by one or more processing units of processing subsystem 804. Storage subsystem 818 may also provide authentication in accordance with the teachings of this disclosure.

Storage subsystem 818 may include one or more non-transitory memory devices, including volatile and non-volatile memory devices. As shown in FIG. 8, storage subsystem 818 includes a system memory 810 and a computer-readable storage media 822. System memory 810 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 800, such as during start-up, may typically be stored in the ROM. The RAM typically contains data and/or program modules that are presently being operated and executed by processing subsystem 804. In some implementations, system memory 810 may include multiple different types of memory, such as static random access memory (SRAM), dynamic random access memory (DRAM), and the like.

By way of example, and not limitation, as depicted in FIG. 8, system memory 810 may load application programs 812 that are being executed, which may include various applications such as Web browsers, mid-tier applications, relational database management systems (RDBMS), etc., program data 814, and an operating system 816. By way of example, operating system 816 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 822 may store programming and data constructs that provide the functionality of some examples. Computer-readable media 822 may provide storage of computer-readable instructions, data structures, program modules, and other data for computer system 800. Software (programs, code modules, instructions) that, when executed by processing subsystem 804 provides the functionality described above, may be stored in storage subsystem 818. By way of example, computer-readable storage media 822 may include non-volatile memory such as a hard disk drive, a magnetic disk drive, an optical disk drive such as a CD ROM, DVD, a Blu-Ray® disk, or other optical media. Computer-readable storage media 822 may include, but is not limited to, Zip® drives, flash memory cards, universal serial bus (USB) flash drives, secure digital (SD) cards, DVD disks, digital video tape, and the like. Computer-readable storage media 822 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain examples, storage subsystem 818 may also include a computer-readable storage media reader 820 that may further be connected to computer-readable storage media 822. Reader 820 may receive and be configured to read data from a memory device such as a disk, a flash drive, etc.

In certain examples, computer system 800 may support virtualization technologies, including but not limited to virtualization of processing and memory resources. For example, computer system 800 may provide support for executing one or more virtual machines. In certain examples, computer system 800 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 800. Accordingly, multiple operating systems may potentially be run concurrently by computer system 800.

Communications subsystem 824 provides an interface to other computer systems and networks. Communications subsystem 824 serves as an interface for receiving data from and transmitting data to other systems from computer system 800. For example, communications subsystem 824 may enable computer system 800 to establish a communication channel to one or more client devices via the Internet for receiving and sending information from and to the client devices. For example, when computer system 800 is used to implement bot system 120 depicted in FIG. 1, the communication subsystem may be used to communicate with a chatbot system selected for an application.

Communication subsystem 824 may support both wired and/or wireless communication protocols. In certain examples, communications subsystem 824 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some examples, communications subsystem 824 may provide wired network connectivity (e.g., Ethernet) in addition to or instead of a wireless interface.

Communication subsystem 824 may receive and transmit data in various forms. In some examples, in addition to other forms, communications subsystem 824 may receive input communications in the form of structured and/or unstructured data feeds 826, event streams 828, event updates 830, and the like. For example, communications subsystem 824 may be configured to receive (or send) data feeds 826 in real-time from users of social media networks and/or other communication services such as Twitter® feeds, Facebook® updates, web feeds such as Rich Site Summary (RSS) feeds, and/or real-time updates from one or more third party information sources.

In certain examples, communications subsystem 824 may be configured to receive data in the form of continuous data streams, which may include event streams 828 of real-time events and/or event updates 830, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 824 may also be configured to communicate data from computer system 800 to other computer systems or networks. The data may be communicated in various different forms such as structured and/or unstructured data feeds 826, event streams 828, event updates 830, and the like to one or more databases that may be in communication with one or more streaming data source computers coupled to computer system 800.

Computer system 800 may be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 800 depicted in FIG. 8 is intended only as a specific example. Many other configurations having more or fewer components than the system depicted in FIG. 8 are possible. Based on the disclosure and teachings provided herein, it should be appreciated that there are other ways and/or methods to implement the various examples.

Although specific examples have been described, various modifications, alterations, alternative constructions, and equivalents are possible. Examples are not restricted to operation within certain specific data processing environments, but are free to operate within a plurality of data processing environments. Additionally, although certain examples have been described using a particular series of transactions and steps, it should be apparent to those skilled in the art that this is not intended to be limiting. Although some flowcharts describe operations as a sequential process, many of the operations may be performed in parallel or concurrently. In addition, the order of the operations may be rearranged. A process may have additional steps not included in the figure. Various features and aspects of the above-described examples may be used individually or jointly.

Further, while certain examples have been described using a particular combination of hardware and software, it should be recognized that other combinations of hardware and software are also possible. Certain examples may be implemented only in hardware, or only in software, or using combinations thereof. The various processes described herein may be implemented on the same processor or different processors in any combination.

Where devices, systems, components or modules are described as being configured to perform certain operations or functions, such configuration may be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes may communicate using a variety of techniques including but not limited to conventional techniques for inter-process communications, and different pairs of processes may use different techniques, or the same pair of processes may use different techniques at different times.

Specific details are given in this disclosure to provide a thorough understanding of the examples. However, examples may be practiced without these specific details. For example, well-known circuits, processes, algorithms, structures, and techniques have been shown without unnecessary detail in order to avoid obscuring the examples. This description provides example examples only, and is not intended to limit the scope, applicability, or configuration of other examples. Rather, the preceding description of the examples will provide those skilled in the art with an enabling description for implementing various examples. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific examples have been described, these are not intended to be limiting. Various modifications and equivalents are within the scope of the following claims.

In the foregoing specification, aspects of the disclosure are described with reference to specific examples thereof, but those skilled in the art will recognize that the disclosure is not limited thereto. Various features and aspects of the above-described disclosure may be used individually or jointly. Further, examples may be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate examples, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

While illustrative examples of the application have been described in detail herein, it is to be understood that the inventive concepts may be otherwise variously embodied and employed, and that the appended claims are intended to be construed to include such variations, except as limited by the prior art.

What is claimed is:

1. A computer-implemented method comprising:

receiving an utterance from a user;

inputting, by a deep learning named entity recognition (NER) subsystem, the utterance into a neural network comprising a Bidirectional Long Short-Term Memory Conditional Random Field (BiLSTM-CRF) architecture and model parameters learned for named entity recognition;

generating, by the neural network of the NER subsystem, a first representation of one or more named entities based on the utterance;

searching, by an elastic search subsystem, a gazetteer, comprising executing an elastic entity search on the gazetteer based on the utterance to generate an initial search result;

multi-hot encoding, by the elastic search subsystem, the initial search result to generate a second representation of the one or more named entities identified in the utterance, wherein multi-hot encoding the initial search result includes generating the second representation that includes two or more nonzero terms based on a relative location of tokens in the initial search result;

combining, by a conditional random field (CRF) layer of the BiLSTM-CRF, the first representation with the second representation to generate a combined named entity representation;

outputting, by the CRF layer, the combined named entity representation; and based on the combined named entity representation, generating a response and providing the response to the user as speech output via a speaker and/or text output via a display.

2. The method of claim 1, wherein combining the first representation with the second representation comprises:

computing a weighted linear interpolation of the first representation and the second representation.

3. The method of claim 1, wherein combining the first representation with the second representation comprises:

concatenating the first representation and the second representation.

4. The method of claim 1, wherein combining the first representation with the second representation comprises:

computing a sequence of attention vectors based on the first representation and the second representation.

5. The method of claim 1, wherein the method is performed by a machine learning model comprising the neural network, the method further comprising training the machine learning model by:

accessing a training utterance;

inputting the training utterance into the neural network;

generating, by the neural network, a first training representation based on the training utterance;

searching the gazetteer based on the training utterance to generate a second training representation; and training the machine learning model based on the first training representation and the second training representation.

6. The method of claim 5, wherein training the machine learning model further comprises:

identifying a dropout parameter; and applying the dropout parameter to the first training representation.

7. A system comprising:

one or more processors; and a memory coupled to the one or more processors, the memory comprising a plurality of instructions executable by the one or more processors to cause the one or more processors to perform operations comprising:

receiving an utterance from a user;

inputting, by a deep learning named entity recognition (NER) subsystem, the utterance into a neural network comprising a Bidirectional Long Short-Term Memory Conditional Random Field (BiLSTM-CRF) architecture and model parameters learned for named entity recognition;

generating, by the neural network, a first representation of one or more named entities based on the utterance;

searching, by an elastic search subsystem, a gazetteer, comprising executing an elastic entity search on the gazetteer based on the utterance to generate an initial search result;

multi-hot encoding, by the elastic search subsystem, the initial search result to generate a second representation of the one or more named entities identified in the utterance, wherein multi-hot encoding the initial search result includes generating the second representation that includes two or more nonzero terms based on a relative location of tokens in the initial search result;

combining, by a conditional random field (CRF) layer of the BiLSTM-CRF, the first representation with the second representation to generate a combined named entity representation;

outputting, by the CRF layer, the combined named entity representation; and based on the combined named entity representation, generating a response and providing the response to the user as speech output via a speaker and/or text output via a display.

8. The system of claim 7, wherein the operation of combining the first representation with the second representation comprises:

computing a weighted linear interpolation of the first representation and the second representation.

9. The system of claim 7, wherein the operation of combining the first representation with the second representation comprises:

concatenating the first representation and the second representation.

10. The system of claim 7, wherein the operation of combining the first representation with the second representation comprises:

computing a sequence of attention vectors based on the first representation and the second representation.

11. The system of claim 7, wherein the operations are performable by a machine learning model comprising the neural network, and wherein the operations further comprise training the machine learning model by:

accessing a training utterance;

inputting the training utterance into the neural network;

generating, by the neural network, a first training representation based on the training utterance;

searching the gazetteer based on the training utterance to generate a second training representation; and training the machine learning model based on the first training representation and the second training representation.

12. The system of claim 11, wherein the operation of training the machine learning model further comprises:

identifying a dropout parameter; and applying the dropout parameter to the first training representation.

13. A non-transitory computer-readable memory comprising a plurality of instructions executable by one or more processors to cause the one or more processors to perform operations comprising:

receiving an utterance from a user;

inputting, by a deep learning named entity recognition (NER) subsystem, the utterance into a neural network comprising a Bidirectional Long Short-Term Memory Conditional Random Field (BiLSTM-CRF) architecture and model parameters learned for named entity recognition;

generating, by the neural network of the NER subsystem, a first representation of one or more named entities based on the utterance;

searching, by an elastic search subsystem, a gazetteer, comprising executing an elastic entity search on the gazetteer based on the utterance to generate an initial search result;

multi-hot encoding, by the elastic search subsystem, the initial search result to generate a second representation of the one or more named entities identified in the utterance, wherein multi-hot encoding the initial search result includes generating the second representation that includes two or more nonzero terms based on a relative location of tokens in the initial search result;

combining, by a conditional random field (CRF) layer of the BiLSTM-CRF, the first representation with the second representation to generate a combined named entity representation;

outputting, by the CRF layer, the combined named entity representation; and based on the combined named entity representation, generating a response and providing the response to the user as speech output via a speaker and/or text output via a display.

14. The non-transitory computer-readable memory of claim 13, wherein the operation of combining the first representation with the second representation comprises:

computing a weighted linear interpolation of the first representation and the second representation.

15. The non-transitory computer-readable memory of claim 13, wherein the operation of combining the first representation with the second representation comprises:

concatenating the first representation and the second representation.

16. The non-transitory computer-readable memory of claim 13, wherein the operation of combining the first representation with the second representation comprises:

computing a sequence of attention vectors based on the first representation and the second representation.

17. The non-transitory computer-readable memory of claim 13, wherein the operations are performable by a machine learning model comprising the neural network, and wherein the operations further comprise training the machine learning model by:

accessing a training utterance;

inputting the training utterance into the neural network;

generating, by the neural network, a first training representation based on the training utterance;

searching the gazetteer based on the training utterance to generate a second training representation; and training the machine learning model based on the first training representation and the second training representation.

\* \* \* \* \*